US011308295B2

(12) United States Patent
Kubota et al.

(10) Patent No.: US 11,308,295 B2
(45) Date of Patent: Apr. 19, 2022

(54) HANDHELD OPTICAL INFORMATION READING DEVICE

(71) Applicant: Keyence Corporation, Osaka (JP)

(72) Inventors: Hidehito Kubota, Osaka (JP); Takuki Nakagawa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 20 days.

(21) Appl. No.: 16/813,767

(22) Filed: Mar. 10, 2020

(65) Prior Publication Data

US 2020/0320263 A1 Oct. 8, 2020

(30) Foreign Application Priority Data

Apr. 3, 2019 (JP) .............................. JP2019-071666

(51) Int. Cl.
*G06K 7/10* (2006.01)
*G06K 7/08* (2006.01)
*G06K 7/00* (2006.01)

(52) U.S. Cl.
CPC ......... *G06K 7/10801* (2013.01); *G06K 7/006* (2013.01); *G06K 7/089* (2013.01)

(58) Field of Classification Search
CPC .. G06K 7/10; G06K 7/10544; G06K 7/10564; G06K 7/10574; G06K 7/10584; G06K 2007/10524; G06K 7/10712; G06K 7/10722; G06K 7/10732; G06K 7/10742; G06K 7/10752; G06K 7/10792; G06K 7/10801; G06K 7/10821; G06K 7/10881
See application file for complete search history.

(56) References Cited

U.S. PATENT DOCUMENTS

| 8,061,613 | B2 * | 11/2011 | Gerst, III | ............... G06K 7/146 |
| | | | | 235/455 |
| 9,536,124 | B1 * | 1/2017 | Nunnink | ............ G06K 7/10851 |
| 9,754,146 | B2 * | 9/2017 | Izaki | ................... G06K 7/10732 |
| 9,785,813 | B2 | 10/2017 | Izaki et al. | |

(Continued)

FOREIGN PATENT DOCUMENTS

| JP | 2013156751 A | 8/2013 |
| JP | 2013156754 A | 8/2013 |

*Primary Examiner* — Thien M Le
*Assistant Examiner* — April A Taylor
(74) *Attorney, Agent, or Firm* — Kilyk & Bowersox, P.L.L.C.

(57) ABSTRACT

A handheld optical information reading device is provided which comprises a housing, a grip arranged on the housing, an image capture device, an illuminator, an illumination controller, an imaging controller, an image processor, and a reader. The image capture device captures an image including a symbol. The illuminator includes lighting devices around the periphery of an optical axis of the image capture device. The illumination controller controls the illuminator to selectively successively light up the lighting devices based on a predetermined order whereby irradiating a symbol with light in different illumination directions with respect to the optical axis. The imaging controller controls the image capture device to capture images of the symbol every when the lighting devices are selectively successively lighted up. The image processor creates an outline image of the symbol based on the captured images. The reader reads the symbol based on the created outline image.

20 Claims, 28 Drawing Sheets

(56) References Cited

U.S. PATENT DOCUMENTS

| | | | |
|---|---|---|---|
| 2010/0258632 A1* | 10/2010 | Good | G06K 7/10831 |
| | | | 235/472.01 |
| 2012/0067955 A1* | 3/2012 | Rowe | G06K 7/1417 |
| | | | 235/454 |
| 2016/0034734 A1* | 2/2016 | Nagata | G06K 7/10574 |
| | | | 235/455 |
| 2020/0104556 A1* | 4/2020 | Gillet | G06K 7/10742 |
| 2020/0202089 A1* | 6/2020 | Suman | G06K 7/10831 |

\* cited by examiner

44

41

42b

HANDHELD OPTICAL INFORMATION READING DEVICE

CROSS-REFERENCE TO RELATED APPLICATIONS

The present application claims priority under 35 U. S. C. § 119 to Japanese Patent Application No. 2019-071666, filed Apr. 3, 2019, the contents of which are incorporated herein by reference.

BACKGROUND OF THE INVENTION

1. Field of the Invention

The present disclosure relates to a handheld optical information reading device which reads symbols such as bar code and two-dimensional code.

2. Description of the Related Art

Handheld optical information reading devices are used which read and decode symbols. Some of such handheld optical information reading devices read symbols on various types of workpieces. For example, direct part marking (DPM) is used which directly marks symbols on workpieces by inscribing, embossing, and the like without using labels and the like. Some workpieces have high surface reflectance (e.g., metal workpieces) or specularly reflect light. In some cases, such symbols that are directly formed on a surface of workpieces are read by handheld optical information reading devices.

However, there is a problem that symbols that are inscribed by DPM are sometimes difficult to be read by handheld optical information reading devices. This is because that light irradiated on a surface of a workpiece will be specularly reflected when handheld optical information reading devices read such a DPM symbol. In other words, specular reflection of light irradiated on the surface of the workpiece reduces brightness difference between the symbol and the other part of the surface of the workpiece, and as a result it is difficult for a camera in the reader to extract the contour of the symbol. In a known art, irradiation is optimized to emphasize brightness difference in reflected light between the protruding/recessed part of symbols and the other part of the surface of the workpiece. However, such optimization of lighting direction is a cumbersome task. In addition, users are required to hold the handheld information reading devices in a particular orientation relative to the workpiece. This requirement is inconvenient for users. Additionally, users do not always successfully scan the symbols. That is, such optimization does not essentially solve the above problem (see Japanese Laid-Open Patent Publication Nos. JP 2013-156754 and 2013-156751).

It is one of the objects of the present disclosure to provide a handheld optical information reading devices which can stably read symbols even on a workpiece that has a surface on which light is specularly reflected.

SUMMARY OF THE INVENTION

A handheld optical information reading devices according one aspect of the present invention is provided which optically reads symbols to be read. The handheld optical information reading devices includes a housing, a grip, an image capture device, an illuminator, an illumination controller, an imaging controller, an image processor, and a reader. The grip is arranged on the housing. The image capture device captures an image which can include a symbol. The illuminator includes a plurality of lighting devices arranged around the periphery of an optical axis of the image capture device. The illumination controller controls the illuminator so as to selectively successively light up the plurality of lighting devices based on a predetermined order whereby irradiating the symbol with light in different illumination directions with respect to the optical axis. The imaging controller controls the image capture device so as to capture images of the symbol which is irradiated with light in the different illumination directions every time the plurality of lighting devices are successively lighted up based on the predetermined order by the illumination controller. The image processor creates an outline image of the symbol based on the images which are captured when the symbol is irradiated with light in the different illumination directions. The reader reads the symbol based on the outline image which is created by the image processor. The handheld optical information reading device according to this aspect of the invention can irradiate a symbol to be read with light in two or more directions by the illuminator, and creates an outline-emphasized image of the symbol by synthesizing images which are captured every time irradiating the symbol with light in one of the two or more directions. As a result, symbols including DPM symbols can be decoded by reading the symbols from the outline-emphasized image.

A handheld optical information reading device according another aspect of the present invention is provided which optically reads symbols to be read. The handheld optical information reading device includes a housing, a grip, a console, an image capture device, an illuminator, an illumination controller, an image processor, and a screen. The housing has a first surface and a second surface opposite to the first surface. The grip is arranged on the housing. The console includes control keys which allow users to enter numerals or characters, and is arranged on the second surface. The image capture device has an optical axis, and is arranged on the first surface side to capture an image which can include a symbol. The illuminator has a circular or rectangular shape surrounding the optical axis of the image capture device, and includes groups of light sources which are arranged on the first surface side to encircle the optical axis of the image capture device whereby irradiating the symbol with light from the periphery of the symbol a. The illumination controller controls the illuminator so as to light up the groups of light sources whereby simultaneously irradiating the symbol with the light sources from the periphery of a reading opening that is enclosed by the illuminator, which has the circular or rectangular shape, and is slantly opened with respect to the optical axis of the image capture device and housing. The image processor reads the symbol included in the image which is captured by the image capture device when the symbol is irradiated with light from the groups of light sources. The screen is arranged on the second surface, and can display the numerals or characters which are entered through the console and the image which can include the symbol, which is captured by the image capture device when the groups of light sources are lighted up.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION

Figure 1:
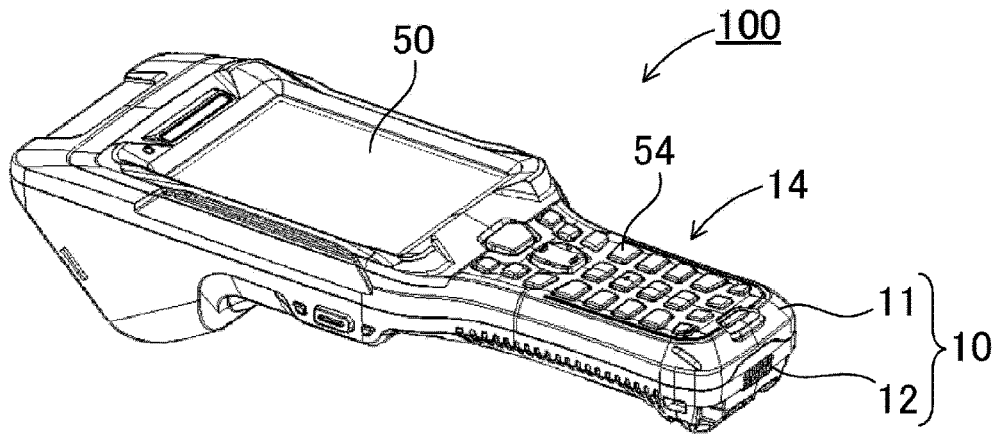
FIG. 1 is a perspective view showing a handheld optical information reading device according to a first embodiment of the present invention.

In a handheld optical information reading device according another aspect of the present invention, in addition to the aforementioned aspect, the illuminator can include three or more lighting devices around the optical axis of the image capture device. Images that include the symbol can be captured every time the three or more lighting devices are selectively successively lighted up based on the predetermined order. The image processor can process the images, which include the symbol, through an algorithm depending on the illumination directions, and synthesizes the images, which are processed through an algorithm depending on the illumination directions, whereby creating the outline image.

In a handheld optical information reading device according still another aspect of the present invention, in addition to any of the aforementioned aspects, the image processor can create a photometric stereo image as the outline image which emphasizes protrusion/recess of the symbol based on the principle of photometric stereo. According to this aspect of the invention, stereo images can be easily obtained based on photometric stereo by the handheld optical information reading device.

In a handheld optical information reading device according still another aspect of the present invention, in addition to any of the aforementioned aspects, the illuminator can have a reading opening that is enclosed by the plurality of lighting devices which are arranged on a circular or rectangular line extending around the optical axis of the image capture device. This handheld optical information reading device can further include a reading supporter that includes at least two supporting points to be in contact with a surface of an object which includes the symbol to be read outside of the reading opening, and is arranged outside relative to the plurality of lighting devices. According to this aspect of the invention, although photometric stereo is generally considered unstable for image capture of moving object or with camera shake, this optical information reading device is portable but the supporting points can stably hold the information reading device when the information reading device is pressed against the object so that three-dimensional stereo images can be captured without camera shake and a symbol in the images can be read.

In a handheld optical information reading device according still another aspect of the present invention, in addition to any of the aforementioned aspects, the housing can include the grip which is arranged on one longitudinal end side of the housing, and a screen that displays an image that is captured by the image capture device, and is arranged on another longitudinal end side. The grip can include a console that includes control keys to be operated by users. Display on the screen can be changed by the user's operation.

In a handheld optical information reading device according still another aspect of the present invention, in addition to any of the aforementioned aspects, the housing can include a first part that has a plate shape with a substantially constant thickness, and a second part that is located adjacent to the first part. The grip and the reading opening are arranged on the first and second parts, respectively. The screen can be arranged on a surface of the housing that is opposite to another surface on which the reading opening is formed, and lies astride the first and second parts.

In a handheld optical information reading device according still another aspect of the present invention, in addition to any of the aforementioned aspects, the screen can display a real-time image that is updated at timing of image capture every time all the lighting devices of the illuminator are lighted up. According to this aspect of the invention, even when users hold and place the handheld optical information reading device over a workpiece which includes a symbol, they can see the symbol in a real-time image which is displayed on the screen. As a result, users can smoothly capture images and read the symbol.

In a handheld optical information reading device according still another aspect of the present invention, in addition to any of the aforementioned aspects, the screen can have a real-time image display area that displays the real-time image on the back surface side of the image capture device. According to this aspect of the invention, a real-time image is displayed at a position corresponding to the image capture device which is accommodated in the housing. Even when users hold the handheld optical information reading device so as to hide a symbol inside the handheld optical information reading device, users will feel as if they see the symbol passing through the handheld optical information reading device. Therefore, the operability of the handheld optical information reading device can be improved.

In a handheld optical information reading device according still another aspect of the present invention, in addition to any of the aforementioned aspects, the reader reads the symbol only in a central part of the image capture area which is extracted by cutting out upper and lower end parts of the image capture area having a predetermined height. According to this aspect of the invention, the processing time can be shortened by limiting an area to be read but wide view can be provided to easily find a symbol. As a result, user convenience can be improved.

In a handheld optical information reading device according still another aspect of the present invention, in addition to any of the aforementioned aspects, the screen can display an image which includes the upper and lower end parts of the image capture area, which are cut out by the reader. According to this aspect of the invention, internal processing of the handheld optical information reading device can be faster by cutting out parts of the image but the entire image which includes the cut-out part is displayed on the screen so that good visibility can be provided to users.

In a handheld optical information reading device according still another aspect of the present invention, in addition to any of the aforementioned aspects, the image processor can create the outline image of the symbol by synthesizing the photometric stereo images based on the principle of photometric stereo if a working distance between the symbol to be read and the handheld optical information reading device is lower than a predetermined value, and does not perform the photometric stereo synthesis if the working distance is not lower than the predetermined value.

In a handheld optical information reading device according still another aspect of the present invention, in addition to any of the aforementioned aspects, a distance-measuring device that measures a working distance between the symbol to be read and the handheld optical information reading device can be further provided. The image processor performs the photometric stereo synthesis if the working distance is lower than a predetermined value, and dose not perform the photometric stereo synthesis if the working distance is not lower than the predetermined value.

In a handheld optical information reading device according still another aspect of the present invention, in addition to any of the aforementioned aspects, a zoom lens that is optically connected to the image capture device can be further provided. The image processor creates the outline image of the symbol by synthesizing the photometric stereo images based on the principle of photometric stereo if a magnification of the zoom lens is higher than a predetermined magnification, and does not perform the photometric stereo synthesis if the magnification of the zoom lens is not higher than the predetermined magnification.

In a handheld optical information reading device according still another aspect of the present invention, in addition to any of the aforementioned aspects, the illumination controller can include an illumination changer that switches between photometric stereo illumination and multi-angle illumination modes which differently control lighting of the illuminator. The symbol can be irradiated with light based on the principle of photometric stereo in the photometric stereo illumination mode. The symbol can be irradiated with light at angles of bright-field and dark-field in the multi-angle illumination mode. According to this aspect of the invention, a symbol to be read can be selectively read from images captured at multi-angle illuminations or photometric stereo images by a single handheld optical information reading device depending on the symbol.

In a handheld optical information reading device according still another aspect of the present invention, in addition to any of the aforementioned aspects, the illuminator can include a lighting device for photometric stereo illumination and a lighting device for the multi-angle illumination which are separately provided.

In a handheld optical information reading device according still another aspect of the present invention, in addition to any of the aforementioned aspects, the image processor can successively create four outline images that are created in four sets of image-capture conditions of the illuminator and the image capture device corresponding to combinations of whether the symbol to be read protrudes or is recessed and whether it is bold or thin, and can terminate the reading of the symbol without newly creating another outline image if the symbol is successfully read from any of the outline images which have been created by the image processor.

In a handheld optical information reading device according still another aspect of the present invention, in addition to any of the aforementioned aspects, the illuminator can further include a reflector, a coaxial lighting device, a first group of lighting devices, and a second group of lighting devices. The reflector is arranged inside the reading opening on the optical axis of the image capture device, and reflects incident light toward the image capture device. The coaxial lighting device is arranged on the first surface side, and emits light coaxially with the optical axis of the image capture device. The first group of lighting devices is arranged in a ring shape around the optical axis of the image capture device. The second group of lighting devices is arranged in a ring shape around the optical axis of the image capture device further away from the image capture device relative to the first group of lighting devices. The illumination controller can selectively light up the first and second groups of lighting devices. The image capture device can capture the image which can include the symbol through light that is reflected by the reflector. The image processor can read the symbol from the images that are captured both when the symbol is irradiated with light by the first group of lighting devices and when the symbol is irradiated with light by the second group of lighting devices.

In a handheld optical information reading device according still another aspect of the present invention, in addition to any of the aforementioned aspects, the illumination controller can control illumination light depending on an illumination setting which is selected through the console.

In a handheld optical information reading device according still another aspect of the present invention, in addition to any of the aforementioned aspects, the illumination controller can change adjustment parameters relating to the first or second group of lighting devices when lighting up the illuminator. The adjustment parameters include at least a characteristic size parameter relating to a character size or dot size of the symbol to be read and an inversion parameter of protrusion/recess of the symbol. The image processor can determine the adjustment parameters based on decoded results from a plurality of images that are captured when the symbol is irradiated with light in conditions corresponding to differently controlled adjustment parameters by the illuminator.

In a handheld optical information reading device according still another aspect of the present invention, in addition to any of the aforementioned aspects, the illuminator can further include a diffusion plate that diffuses light that is emitted by the groups of light sources.

The embodiments will now be described with reference to the accompanying drawings, wherein like reference numerals designate corresponding or identical elements throughout the various drawings.

It should be appreciated, however, that the embodiments described below are illustrations of a handheld optical information reading device and an optical information reading method to give a concrete form to technical ideas of the invention, and a handheld optical information reading device and an optical information reading method of the invention are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element.

First Embodiment

Figure 2:
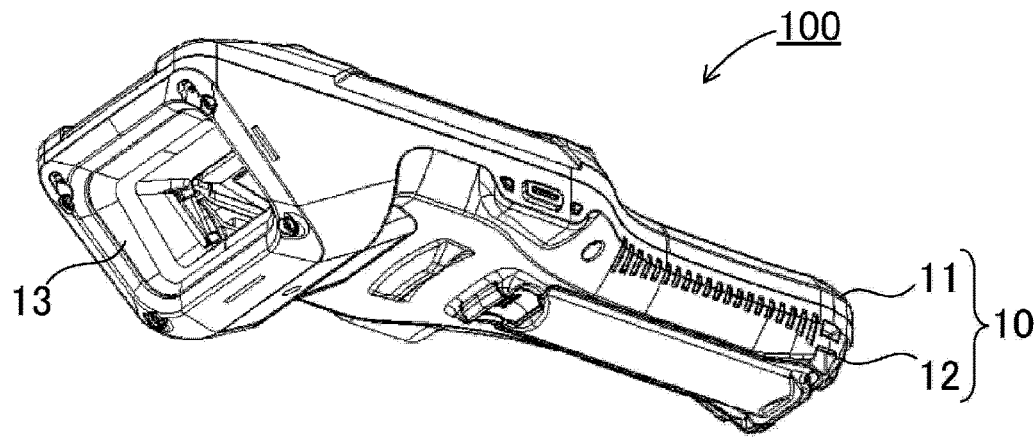
FIG. 2 is a perspective view showing the handheld optical information reading device shown in FIG. 1 as viewed from the lower side.
Figure 3:
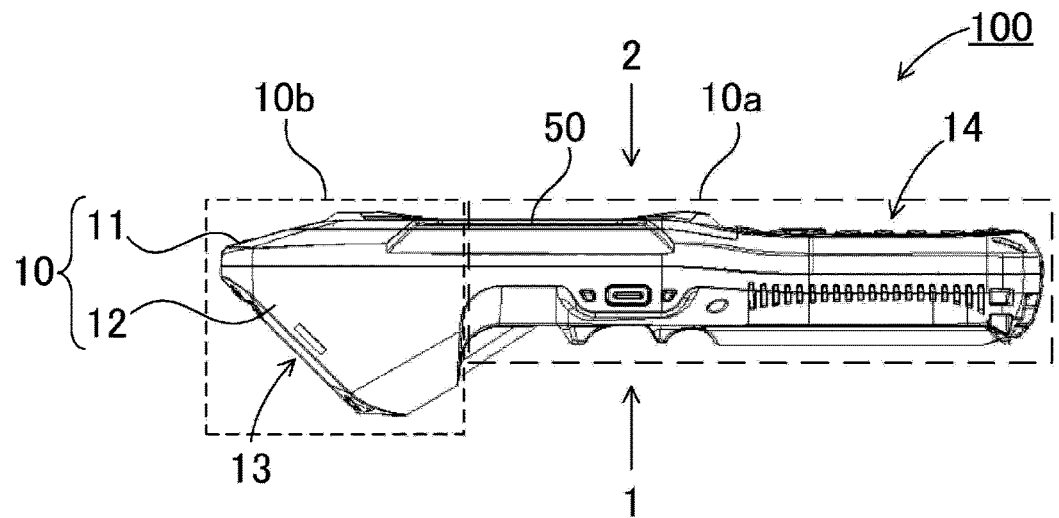
FIG. 3 is a side view showing the handheld optical information reading device shown in FIG. 1.
Figure 4:
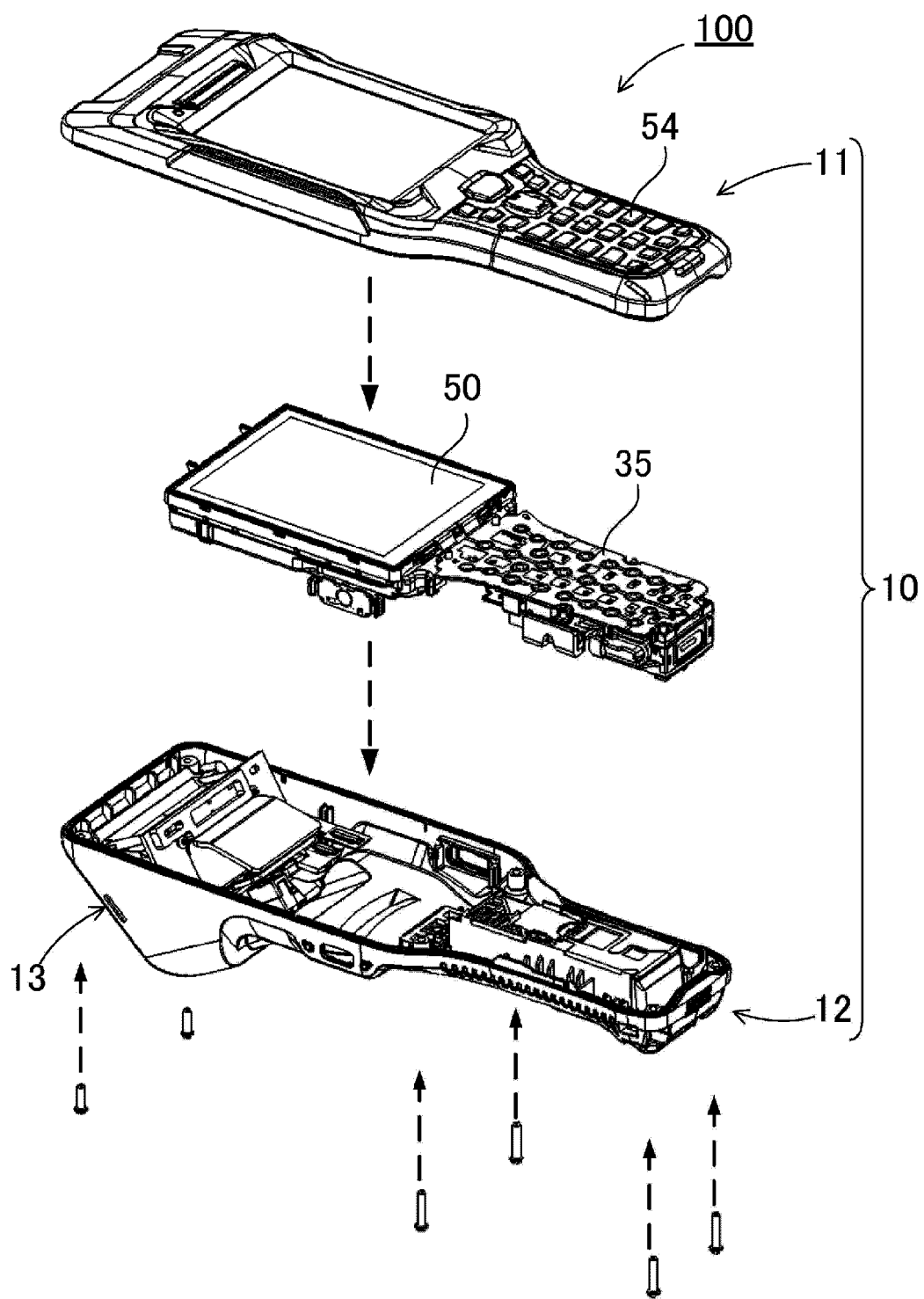
FIG. 4 is an exploded perspective view showing the handheld optical information reading device shown in FIG. 1.
Figure 5:
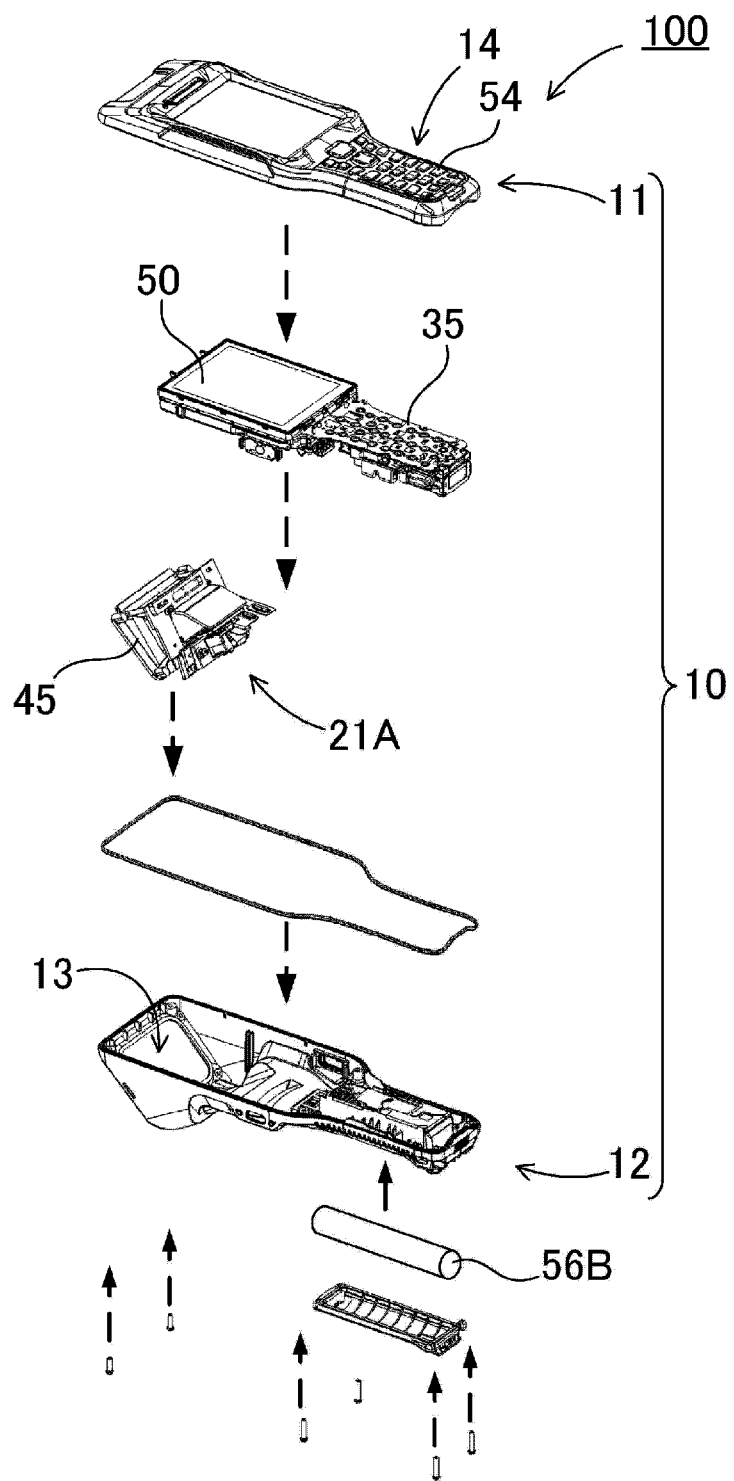
FIG. 5 is another exploded perspective view showing the handheld optical information reading device shown in FIG. 4.
Figure 6:
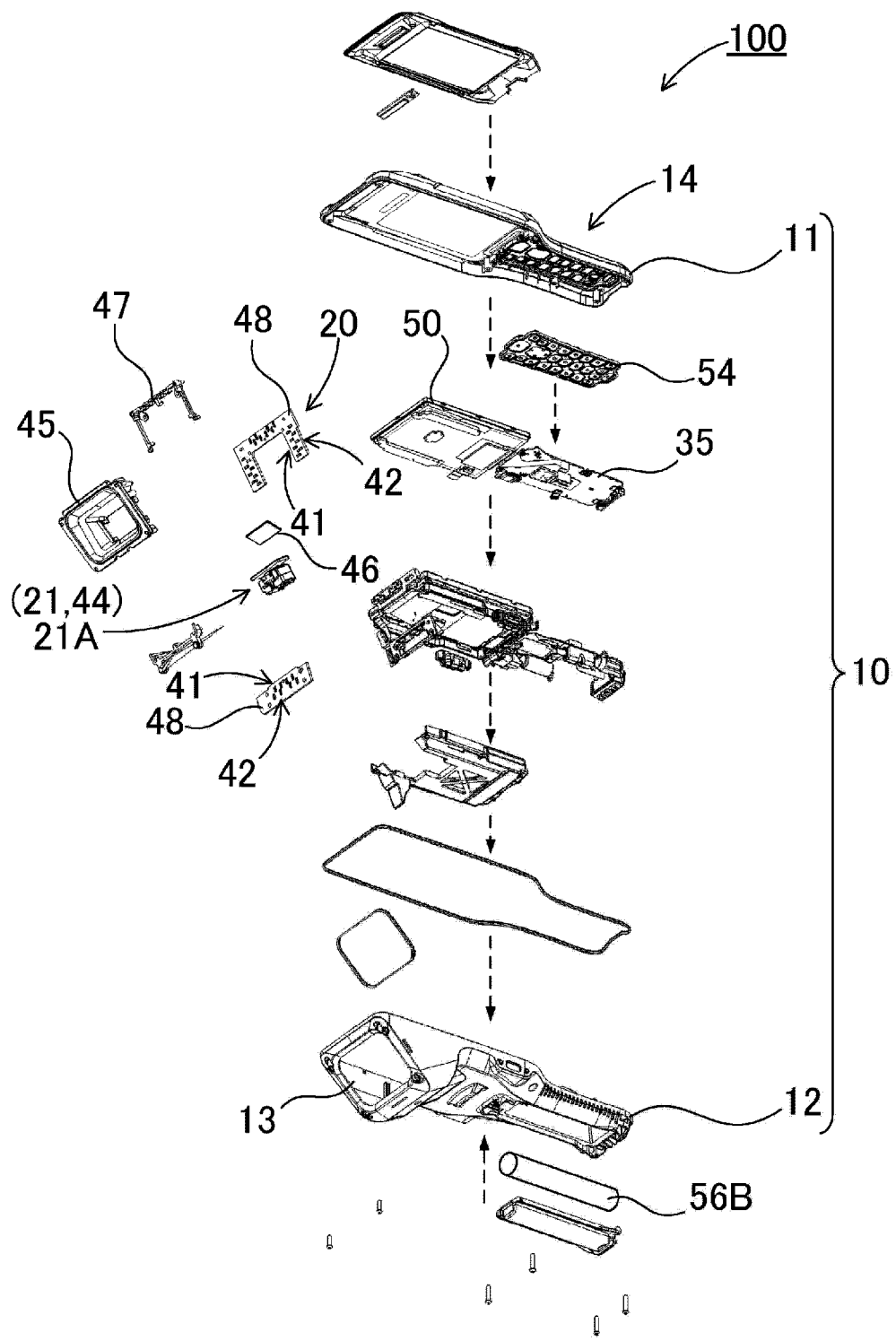
FIG. 6 is an exploded perspective view showing the handheld optical information reading device shown in FIG. 1 as viewed from the front and lower side.
Figure 7:
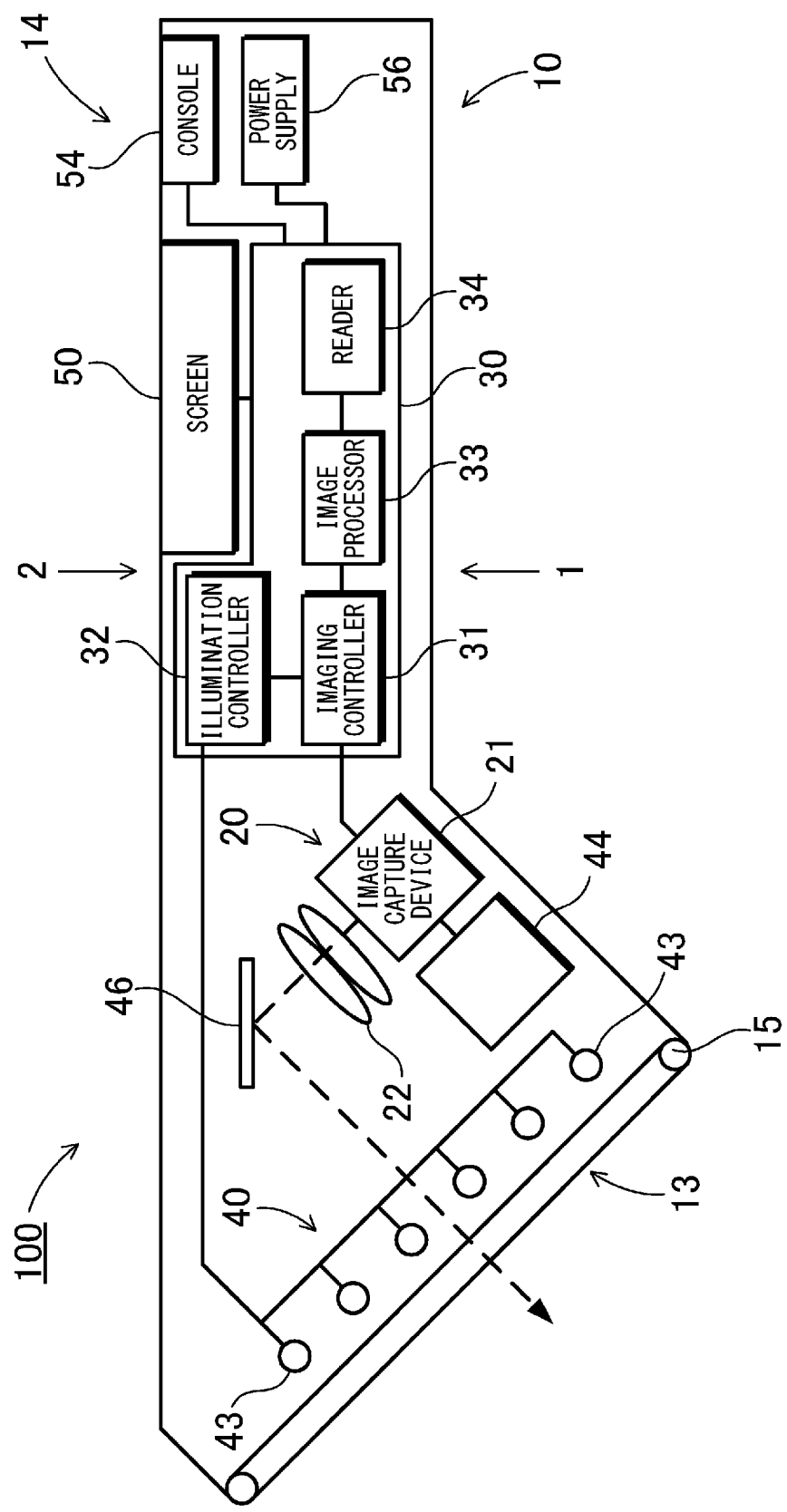
FIG. 7 is a block diagram showing the handheld optical information reading device shown in FIG. 1.

A handheld optical information reading device 100 according to a first embodiment serves to read symbols (e.g., bar codes and two dimensional codes) and to store data that is read from the symbols or compare it with previously stored data. Such a handheld optical information reading device is also called handy terminal, commercial-use PDA, and the like. In particular, the handheld optical information reading device 100 according to a first embodiment can stably read symbols even if they have protrusion/recess which is formed for example by inscribing an object with the symbols to be read (read-target object) by using DPM. FIGS. 1 to 7 show the handheld optical information reading device 100 according to the first embodiment of the present invention. FIG. 1 is a perspective view showing the handheld optical information reading device 100 according to the first embodiment of the present invention. FIG. 2 is a perspective view showing the handheld optical information reading device 100 shown in FIG. 1 as viewed from the lower side. FIG. 3 is a side view showing the handheld optical information reading device 100 shown in FIG. 1. FIG. 4 is an exploded perspective view showing the handheld optical information reading device 100 shown in FIG. 1. FIG. 5 is another exploded perspective view showing the handheld optical information reading device 100 shown in FIG. 4. FIG. 6 is an exploded perspective view showing the handheld optical information reading device 100 shown in FIG. 1 as viewed from the front and lower side. FIG. 7 is a block diagram showing the handheld optical information reading device 100 shown in FIG. 1.

The illustrated handheld optical information reading device 100 includes a housing 10, a grip 14, an imaging unit 20, a general processor 30, a screen 50, a console 54, and a power supply 56. The imaging unit 20 includes an image capture device 21 and an illuminator 40. In the handheld optical information reading device 100, a symbol to be read is irradiated with light in two or more directions by the illuminator 40. The image capture device 21 captures images every time irradiating the symbol with light in one of the two or more directions. The handheld optical information reading device 100 creates an outline-emphasized image of the symbol by synthesizing the captured images, and read the symbol in the synthesized image. Users grasp the grip 14 and hold the handheld optical information reading device 100 in an orientation toward the symbol. In this orientation, the symbol is read by pressing a trigger switch which is arranged on the console 54 with their thumb or finger.

The housing 10 forms an exterior shape of the handheld optical information reading device 100. The housing 10 accommodates the imaging unit 20, the screen 50, a circuit board 35, the power supply 56, and the like. In this embodiment, the housing 10 has an elongated shape which extends in one direction. A display area surface of the screen 50 and the grip 14 are aligned in the one direction. The imaging unit 20 is arranged on the fore end side in the housing 10. The power supply 56 is arranged on the rear end side in the grip 14. The housing 10 includes upper and lower cases 11 and 12 which form upper and lower halves of the housing, respectively, as shown in the exploded perspective views of FIGS. 4 to 6. The lower case 12 forms a lower surface of the housing 10, and has a reading opening 13 which is slantly opened in a frontward and downward direction. The upper case 11 has a flat upper surface from which the display area surface of the screen 50 is exposed. The display area surface of the screen 50 has an elongated rectangular shape which extends in the one direction. The housing 10 is formed of a lightweight material having a sufficient strength, for example, of a resin.

The housing 10 includes a plate-shaped part which has a roughly constant thickness. The housing 10 includes a first part 10a, and a second part 10b which is arranged adjacent to the first part 10a, as shown in FIG. 3. The first part 10a is located on the rear end side (right side in FIG. 3) of the handheld optical information reading device 100. The second part 10b is located on the fore end side (left side in FIG. 3). The grip 14 is arranged on the first part 10a.

The reading opening 13 is formed in the second part 10b. The screen 50 is arranged on a surface of the housing 10 which is opposite to a surface in which the reading opening 13 is formed, and straddles the first and second parts 10a and 10b.

The grip 14 is arranged on a part for the housing 10. Users grasp the grip 14. The grip 14 and the housing 10 can be separately formed, or be integrally formed with each other. In the embodiment shown in FIGS. 1 to 5, the grip 14 is integrally formed with the rear end part of the housing 10. Alternatively, the grip 14 may be removably attached to the housing 10.

The console 54 is arranged on in the grip. The console 54 includes various types of control keys to be operated by users with their thumb or finger. Users can control display of the display area surface, or instruct various types of operations such as irradiation of illumination light or aiming light, reading, image capture, and the like by using the control keys. The control keys include the trigger switch which starts reading, an aiming switch which actuates irradiation with aiming light, for example. A touch panel can be used as the console 54. The console can be a touch panel which is separately formed from the screen 50. Alternatively, the screen 50 can extend to a part where the console 54 is arranged so that the extended part of the screen serves as the console.

The screen 50 displays an image which is captured by the image capture device 21, and the various types of information (e.g., information relating to reading result and commercial-use application). The screen 50 mainly displays information relating to commercial-use application, and additionally serves to assist users to easily read symbols through images on the screen 50. The images displayed on the screen 50 can be changed by the user's operation. The images displayed on the screen 50 can be changed by user's key entries, touch-panel entries, instructions from a server, and the like. The screen 50 is constructed of an LCD, organic electroluminescence, or the like. The display area surface of the screen 50 has an elongated rectangular shape which extends in the one direction, and is exposed from the upper surface of housing 10. The display area surface serves to display information relating to captured images, settings, and the like. A touch panel can be used as the display area surface.

The image capture device 21 captures images which can include a symbol to be read. The image capture portion 21 is constructed of an imaging element (image sensor) such as CMOS, CCD, or the like. The image capture device 21 includes one or more optical lenses 22 which direct light reflected from an object to be read to the imaging element and form its image on the imaging element.

The illuminator 40 illuminates a symbol (irradiates the symbol with illumination light) when the image capture device 21 captures an image of the symbols. The illuminator 40 includes a plurality of lighting devices 43 which are arranged around an optical axis of the image capture device 21. The illuminator 43 is constructed of LEDs, organic electroluminescence, or the like.

The power supply 56 supplies driving electric power to the illuminator 40, the image capture device 21, the general processor 30, the screen 50, and the like. In this embodiment, the power supply 56 is constructed of a rechargeable battery 56B as shown in the exploded perspective view of FIG. 6. Accordingly, the handheld optical information reading device 100 can be used as a portable and cordless information reading device.

The general processor 30 includes an imaging controller 31, an illumination controller 32, an image processor 33, and a reader 34. The general processor 30 is constructed of a CPU, MPU, SoC, ASIC, or the like.

The illumination controller 32 controls the illuminator 40 so as to selectively successively light up the plurality of lighting devices 43 based on a predetermined order whereby irradiating a symbol with light in different illumination directions with respect to the optical axis.

The imaging controller 31 controls the image capture device 21 so as to capture images of the symbol which is irradiated with light in the different illumination directions every time the plurality of lighting devices 43 are selectively successively lighted up based on the predetermined order by the illumination controller 32. The imaging controller 31 is correlated to the illumination controller 32 so that the lighting of the illuminator 40 and the image capture by the image capture device 21 are synchronized with each other.

The image processor 33 creates an outline image of the symbol, which represents stepped parts (protruding parts or recessed parts) corresponding to the symbol, based on the images which are captured when the symbol is irradiated with light in the different illumination directions.

The reader 34 reads the symbol based on the outline image which is created by the image processor 33. Symbols to be read by the reader include codes (e.g., bar codes, two dimensional codes), and a character string. Examples of the codes can be provided by standardized codes including QR Code, MicroQR code, DataMatrix, GS1 Data Matrix, Aztec, PDF417, Micro PDF417, GS1 Data Bar14, Limited, Stacked, Expanded+Composite, UPC/EAN/GS1-128/ITF/Codabar, Maxi Code (trade names), and the like. The codes can be decoded in accordance with their corresponding standards. The reader 34 decodes a code in accordance with its corresponding standards. Also, original codes which are not standardized may be used. A character string in this specification refers to a series of characters and signs. In the case in which a character string is read, decoding is unnecessary. For this reason, the reader 34 extracts the character string (performs OCR).

Illuminator 40

The illuminator 40 includes three or more lighting devices 43 which are arranged around the optical axis of the image capture device 21. The imaging controller 31 controls the image capture device 21 so as to capture images which include a symbol every time three or more lighting devices 43 are successively lighted up one after another by the illumination controller 32. The image processor 33 processes the images, which include the symbol, through an algorithm depending on the illumination directions, and synthesizes the images, which are processed through an algorithm depending on the illumination directions, whereby creating the outline image.

Figure 8:
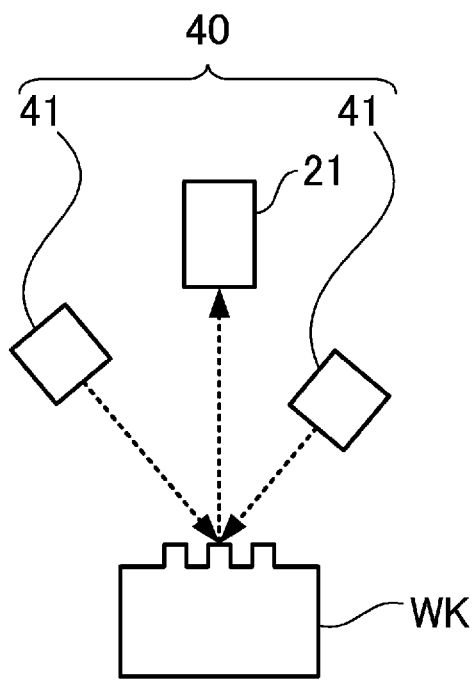
FIG. 8 is a schematic view illustrating photometric stereo which captures a plurality of images of a target area from a fixed viewpoint when the target area is irradiated with light in different directions whereby estimating surface normals (surface inclinations) at points in the target area based on brightness variation of the points which are included in the images of the target area.

The image processor 33 creates a photometric stereo image as the outline image which emphasizes stepped parts of the symbol based on the principle of photometric stereo. Accordingly, the handheld optical information reading device 100 can easily capture outline images which represent protruding or recessed shapes of symbols to be read based on the principle of photometric stereo. As shown in FIG. 8, a plurality of images of a target area from a fixed viewpoint are captured by the image capture device 21 when the target area is irradiated with light in different directions of the illuminator 40 (in other words, every time the lighting devices 43 are successively lighted up one after another) whereby estimating surface normals (surface inclinations) at points in the target area based on brightness variation of the points which are included in the images of the target area in photometric stereo. Symbols can be read by creating its outline shape in a photometric stereo manner.

The illumination controller 32 has photometric stereo illumination and multi-angle illumination modes which differently control lighting of the illuminator 40. A symbol is irradiated with light based on the principle of photometric stereo in the photometric stereo illumination mode. Also, a symbol is irradiated with light at different angles or with different lighting pattern such as bright-field and dark-field in the multi-angle illumination mode. A symbol to be read can be selectively read from images captured at multi-angle illuminations or photometric stereo images by a single handheld optical information reading device 100 depending on the symbol.

Lighting Device 43

The illuminator 40 includes a lighting device for photometric stereo illumination and a lighting device for the multi-angle illumination which are separately provided. In the exploded perspective view of FIG. 6, two lighting groups of the lighting devices 43 are arranged around the reading opening 13. More specifically, a first group of lighting devices 41 is arranged on the inner side relative to a second lighting device group 42, and serves as the lighting device for the multi-angle illumination. The second group of lighting devices 42 is arranged on the outer side, and serves as the lighting device for photometric stereo illumination.

Figure 9:
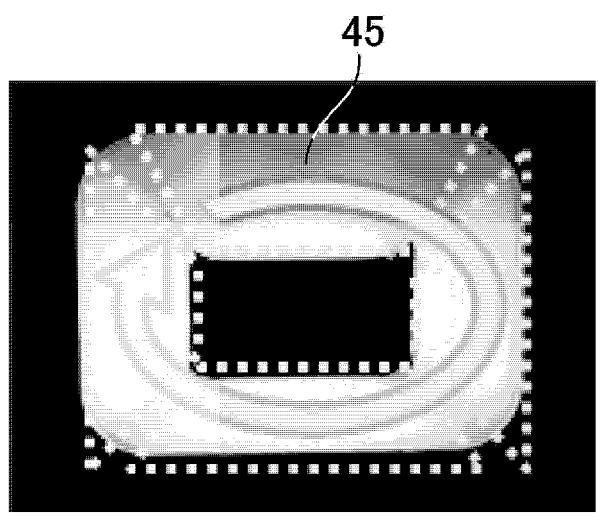
FIG. 9 is a bottom view showing an illuminator which is exposed through a reading opening.

FIG. 9 is a bottom view showing the illuminator 40 which is exposed through the reading opening 13. As shown in this bottom view, the illuminator 40 is constructed of a plurality of light sources and a diffusion plate 45 which has a dome shape and is arranged on the light emission side of the light sources. The light sources are arranged in ring shapes around the image capture device 21. In this specification, "ring shape" includes not only circular outermost profile, but also rectangular or other polygonal outermost profile.

The diffusion plate 45 diffuses light emitted by the light sources.

The aforementioned housing 10 has a first surface 1 and a second surface 2 which is opposite to the first surface 1 as shown in FIGS. 3 and 7. The grip 14 is arranged on the housing 10. The console 54 includes control keys which allow users to enter numerals or characters, and is arranged on the second surface 2. The image capture device 21 is arranged on the first surface 1 side. The image capture device 21 has its optical axis, and captures images which can include a symbol.

The illuminator has a circular or rectangular shape which encloses the optical axis of the image capture device 21. This illuminator includes groups of light sources, a reflector 46, the diffusion plate 45, and a coaxial lighting device. The groups of light sources are arranged on the first surface 1 side. The light sources are arranged in ring shapes around the optical axis of the image capture device 21. The light sources irradiate a symbol with light from the periphery of the symbol. The light sources irradiate the symbol with light at least two different zenith angles including relatively larger and smaller angles with respect to the symbol. The reflector 46 is arranged on the optical axis of the image capture device 21 inside the reading opening 13, and reflects light toward the image capture device 21. The coaxial lighting device 21 is arranged on the first surface 1 side. The coaxial lighting device emits light coaxially with the optical axis of the image capture device 21.

The reading opening 13 is formed in the housing 10. The reading opening 13 is defined by the illuminator which has a circular or rectangular shape. The reading opening 13 is opened in a slanting direction with respect to the optical axis of the image capture device 21 and the housing 10. The illumination controller 32 controls the groups of light sources so as to light up the groups of light sources whereby simultaneously irradiating the symbol with light including bright-field and dark-field light components of the groups of light sources from the periphery of the reading opening 13. The image processor 33 reads the symbol included in an image which is captured by the image capture device 21 when the symbol is irradiated with light from the group or groups of light sources. The screen 50 is arranged on the second surface 2 of the housing 10. The screen 50 can display numerals or characters which are entered through the console 54 and the image which can include the symbol, which is captured by the image capture device 21 when the group or groups of light sources is lighted up.

The illuminator includes the first and second groups of lighting devices 41 and 42. The first group of lighting devices 41 is arranged in a ring shape around the optical axis of the image capture device 21. Also, the second group of lighting devices 42 is arranged in a ring shape around the optical axis of the image capture device 21. The second group of lighting devices 42 is arranged further away from the image capture device 21 relative to the first group of lighting devices 41. The illumination controller 32 can selectively light up the first and second groups of lighting devices 41 and 42. The image capture device 21 captures images which can include a symbol when the symbol is irradiated with light that is reflected by the reflector 46. The image processor 33 reads the symbol from the images which are captured both when the symbol is irradiated with light by the first group of lighting devices 41 and when the symbol is irradiated with light by the second group of lighting devices 42. The first and second groups of lighting devices are described in more detail.

Figure 10A:
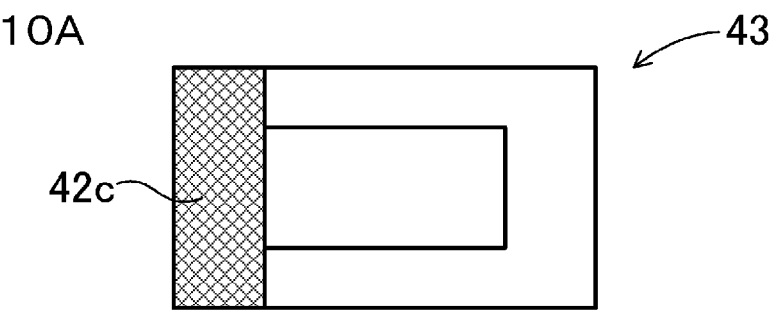
FIG. 10A is a schematic diagram showing the illuminator which emits light from its left side.
Figure 10B:
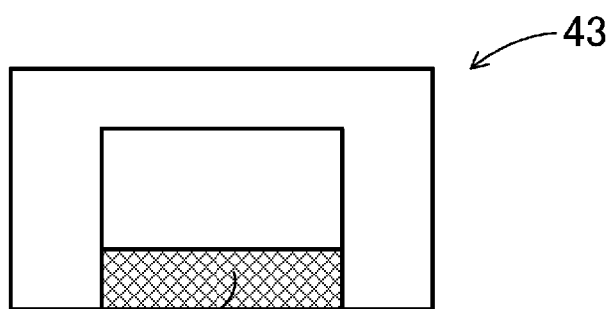
FIG. 10B is a schematic diagram showing the illuminator which emits light from its lower side.
Figure 10C:
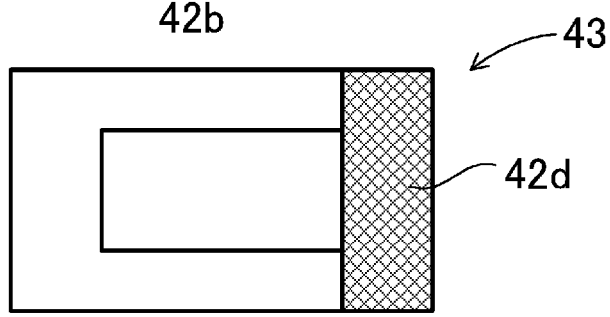
FIG. 10C is a schematic diagram showing the illuminator which emits light from its right side.
Figure 10D:
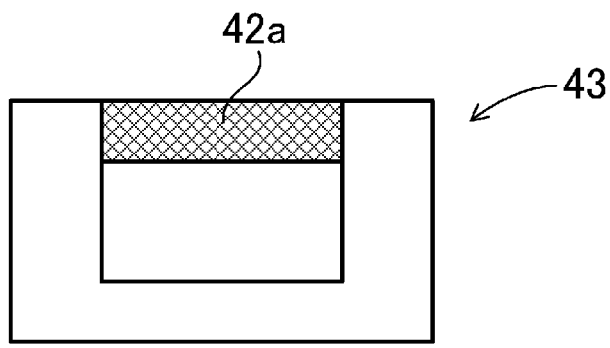
FIG. 10D is a schematic diagram showing the illuminator which emits light from its upper side.

As shown in the exploded perspective view of FIG. 6, two groups of the light sources are arranged on the inner and outer sides relative to each other. In this embodiment, the illuminator 40 is constructed of the first group of the lighting devices 41 which is arranged in a ring shape around the optical axis of the image capture device 21, and the second group of the lighting devices 42 which surrounds the first group of the lighting devices 41. The second group of lighting devices 42 is arranged further away from the image capture device 21 relative to the first group of lighting devices 41. The first and second groups of lighting devices 41 and 42 are independently controlled by the illumination controller 32 when illuminating an object. As discussed above, the first group of the lighting devices 41 serves as the lighting device for multi-angle illumination, and the second group of the lighting devices 42 serves as the lighting device for photometric stereo. In the case in which directionally-illuminated images are captured in photometric stereo, symbols are preferably irradiated with light from peripheral positions away from the symbols. The reason is that a directionally-illuminated part of each image can be emphasized. The first group of lighting devices 41 is used in multi-angle illumination. However, the second group of lighting devices 42 may be additionally used together with the first group of lighting devices 41 in multi-angle illumination. The second group of lighting devices 42 includes an upper-side device 42a, a lower-side lighting device 42b, a right-side lighting device 42d, and a left-side lighting device 42c. FIGS. 10A to 10D show the second group of lighting devices 42 as the lighting devices 43 in which one of lighting devices 42 is lighted up. More specifically, FIG. 10A shows left-side illumination in which the left-side lighting device 42c is lighted up. FIG. 10B shows lower-side illumination in which the lower-side lighting device 42b is lighted up. FIG. 10C shows right-side illumination in which the right-side lighting device 42d is lighted up. FIG. 10D shows upper-side illumination in which the upper-side lighting device 42a is lighted up.

Figure 11:
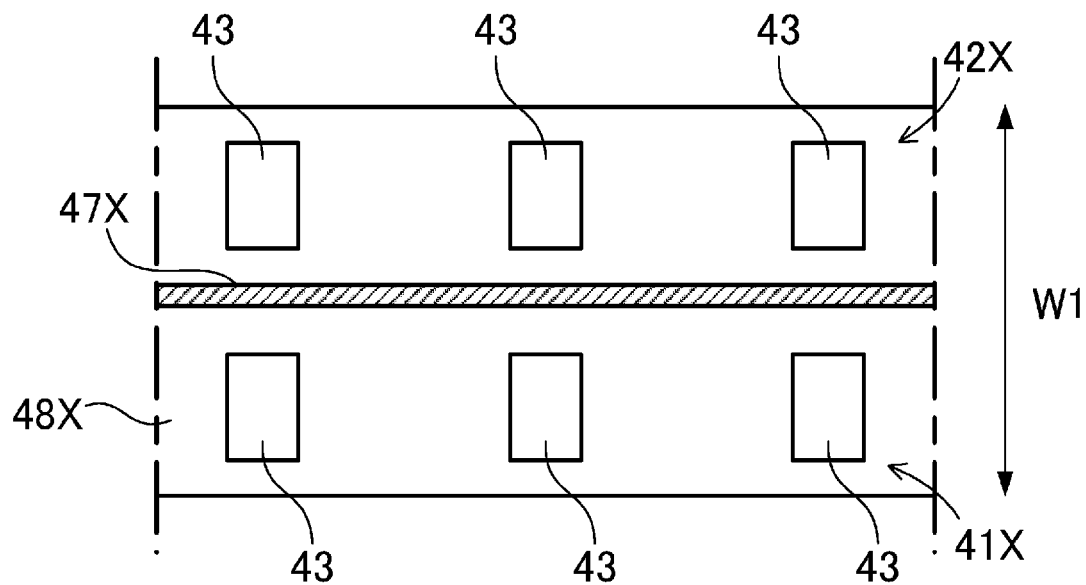
FIG. 11 is a schematic view showing an illustrative arrangement of first and second LEDs of a comparative example.
Figure 12:
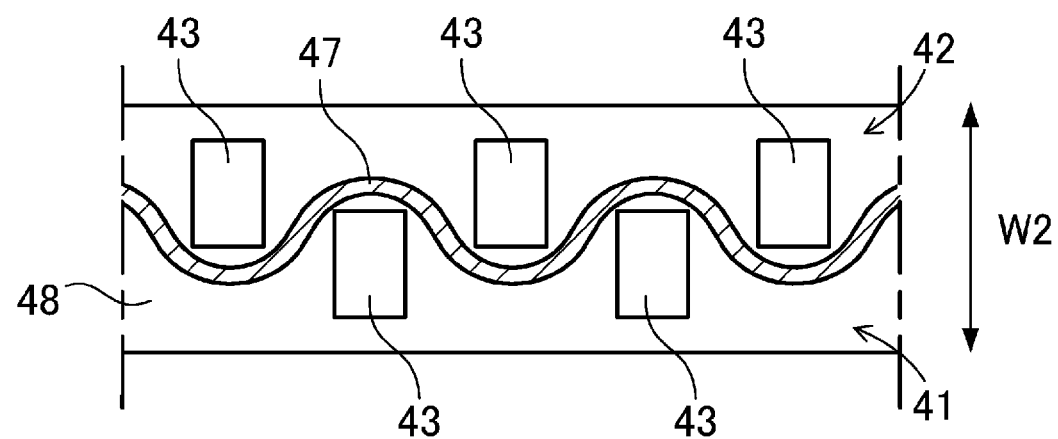
FIG. 12 is a schematic view showing an exemplary arrangement of first and second LEDs shown in FIG. 6.

A surface mount type LED is used as the lighting devices 43 in the first and second groups of lighting devices 41 and 42. In this embodiment, the first and second LEDs in the first and second groups of lighting devices 41 and 42 are not arranged at same height but are offset in the vertical direction as shown in the exploded perspective view of FIG. 6. In other words, the first LEDs are arranged at their corresponding height between the second LEDs so that the first and second LEDs are arranged in a zig-zag arrangement. A light-shield plate 47 which has a wave shape is arranged between the first and second groups of lighting devices 41 and 42 to separate them from each other. If first and second groups of LEDs 41X and 42X are aligned on two straight lines parallel to each other, and a straight light-shield plate 47x extends between the first and second groups of LEDs 41X and 42X as shown in FIG. 11, an LED mount board 48X will have a large vertical width W2. In this case, the height or thickness of the housing is increased. As a result, a handheld optical information reading device which includes such a thick housing has poor portability. To avoid this, the first and second groups of LEDs 41 and 42 are arranged in a zig-zag arrangement, and the light-shield plate 47 has not a straight shape but a wave shape corresponding to the zig-zag arrangement as shown in FIG. 12 in this embodiment. As a result, the vertical width W1 of an LED mount board 48 according to this embodiment can be small. That is, the vertical size of the housing 10 can be small.

Coaxial Lighting Device 44

The illuminator 40 can include a coaxial lighting device 44 which emits light coaxially with the optical axis of the image capture device 21. The coaxial lighting device 44 is included in a camera unit 21A shown in the exploded perspective view of FIG. 6.

Multi-Angle Illumination

Figure 13A:
FIGS. 13A to 13C show exemplary images which are captured in bright field.
Figure 13B:
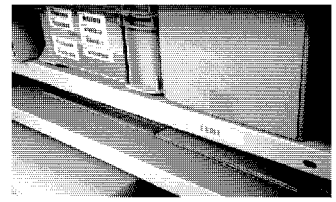
Figure 13C:
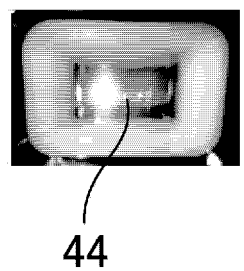

In the multi-angle illumination, an illumination direction, lighting pattern, or the like of the illuminator 40 is changed depending on types of a workpiece to be illuminated when images of the workpiece is captured. In other words, a workpiece can be irradiated with light at different angles corresponding to the light emitting devices in the illuminator 40 or with different lighting pattern of the illuminator 40 depending on types of the workpiece. For example, when the coaxial lighting device 44 directly illuminates a workpiece as shown in FIG. 13C, the workpiece can be observed in bright field as shown in FIG. 13A. Also, the coaxial lighting device 44 can sufficiently illuminate a workpiece even if the workpiece is located away from the reader as shown in FIG. 13B.

Figure 14A:
FIGS. 14A to 14E show exemplary images which are captured by multi-angle illumination.
Figure 14A:
Figure 14B:
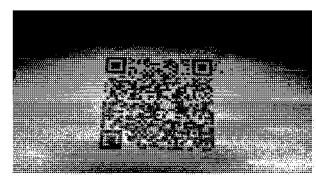
Figure 14C:
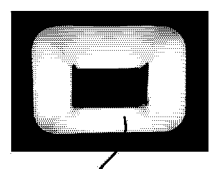
Figure 14D:
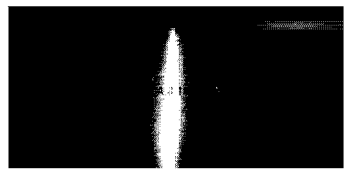
Figure 14E:

In peripheral illumination which uses the first group of lighting devices 41 arranged in a ring shape, an illumination direction of the illuminator can be changed. For example, in the case where all lighting devices 41 in the first group are lighted up, ring-shaped multi-angle illumination can be realized as shown in FIG. 14C. In this case, a character string can be easily read as shown in FIGS. 14B and 14E from the image as shown in FIGS. 14A and 14D.

Figure 15A:
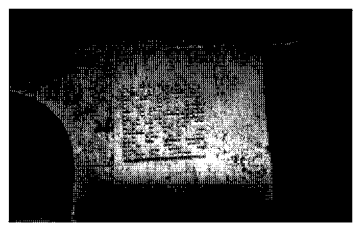
FIGS. 15A to 15C show exemplary images which are captured in dark field.
Figure 15A:
Figure 15B:
Figure 15C:
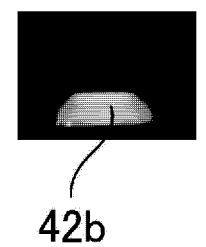
Figure 16G:
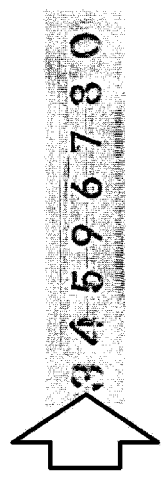
FIG. 16G shows an image (outline-extracted image) which is obtained from images shown in FIGS. 16C and 16F.
Figure 16C:
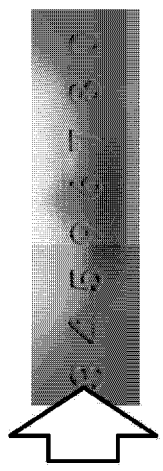
FIG. 16C is a differential image which is obtained from the directionally-illuminated images shown in FIGS. 16A and 16B.
Figure 16F:
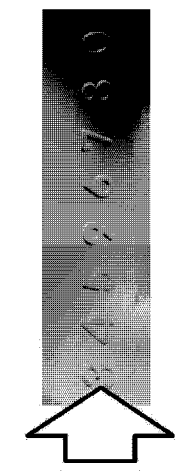
FIG. 16F is a differential image which is obtained from the directionally-illuminated images shown in FIGS. 16D and 16E.
Figure 16B:
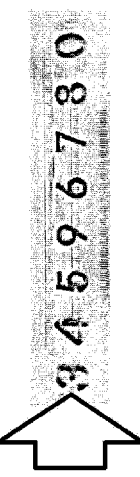
FIG. 16B shows a directionally-illuminated image which is captured when a target area is irradiated with light from the lower side (lower-side illumination)
Figure 16E:
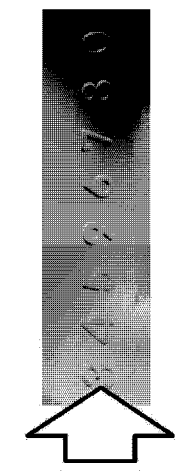
FIG. 16E shows a directionally-illuminated image which is captured when a target area is irradiated with light from the right side (right-side illumination)
Figure 16A:
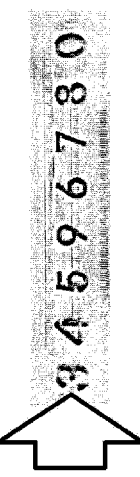
FIG. 16A shows an image (directionally-illuminated image) which is captured when a target area is irradiated with light from the upper side (upper-side illumination) in photometric stereo.
Figure 16D:
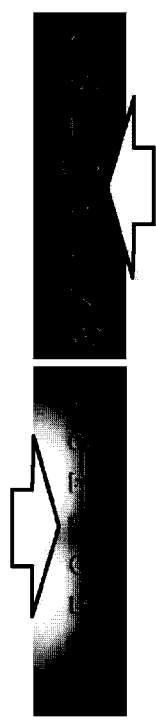
FIG. 16D shows a directionally-illuminated image which is captured when a target area is irradiated with light from the left side (left-side illumination)

Also, some lighting devices 41 in the first group can be lighted up. For example, in the case in which only the lower-side lighting device 42b is lighted up as shown in FIG. 15C, dark field illumination at a low angle shown in FIG. 15A can be realized so that a symbol can be easily read as shown in FIG. 15B. As discussed above, various types of workpieces can be read by changing an illumination direction of the illuminator in multi-angle illumination mode.

Photometric Stereo Illumination

In the photometric stereo illumination, images of a workpiece which includes a symbol having protrusion/recess formed by embossing are captured as shown in FIGS. 16A to 16G, and are processed based on the principle of photometric stereo whereby creating the outline image of the symbol. An outline-extracted image (FIG. 16G) is created from a differential image (FIG. 16C) between directionally-illuminated images (FIGS. 16A and 16B) which are captured when the symbol is illuminated by the upper-side illumination and lower-side illumination, and a differential image (FIG. 16F) between directionally-illuminated images (FIGS. 16D and 16E) which are captured when the symbol is illuminated by the left-side illumination and right-side illumination, in this embodiment.

The console 54 can be constructed to allow users to determine illumination settings on the first and second groups of lighting devices 41 and 42 (e.g., selection between the first and second groups of lighting devices 41 and 42, illumination intensity, ON/OFF of photometric stereo). The illumination controller 32 controls the illuminator 40 based on the illumination settings which are determined by the console 54.

Illumination Changer 49

Figure 17:
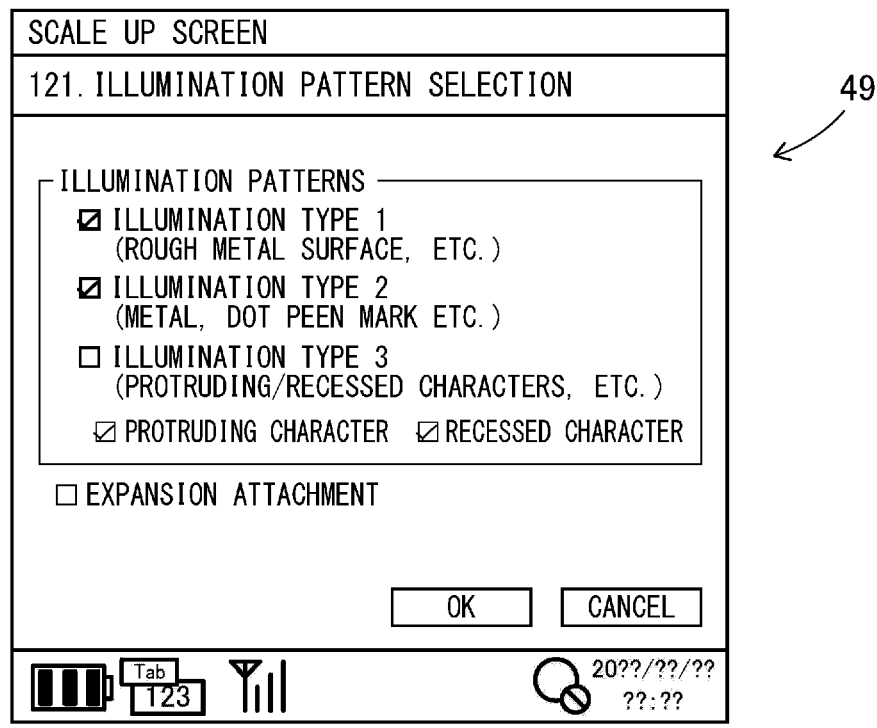
FIG. 17 shows an exemplary image of GUI for illumination pattern selection.

The illumination mode is switched by an illumination changer 49. FIG. 17 shows exemplary GUI of an illumination switching screen as the illumination changer 49. One of multi-angle illumination, lower-side illumination, and photometric stereo illumination can be selected from radio buttons in this embodiment. In this exemplary GUI, illumination Type 1 corresponds to multi-angle illumination which is suitably used to eliminate a background of a metal surface of a workpiece which includes a symbol to be read in the case in which the surface of the workpiece is rough (for example, the workpiece is a casting). Illumination Type 2 corresponds to the lower-side illumination which is suitably used to read a symbol on a metal workpiece, dot-peen-marked workpiece, or the like by using diffused reflection light. Type 3 corresponds to illumination for the photometric stereo which is suitably used to extract protruding or recessed parts of a symbol which is formed by inscribing by using image filters of photometric stereo. Type 3 includes illumination modes for recessed characters and protruding characters.

Photometric Stereo

Photometric stereo is one of three-dimensional measurement techniques for estimating the surface normal vectors of a workpiece by capturing images of the workpiece when the workpiece is irradiated with light in different directions based on the shadows on the captured images. Image processing apparatuses using such photometric stereo creates an image which represents X and Y directional components of the surface normal vectors (corresponding to inclination image) by using brightness, or a reflectance image (corresponding to albedo image), and are used for image inspection. In conventional photometric stereo, in order to capture a plurality of directionally-illuminated images when a target workpiece is irradiated with light in different directions, a plurality of illuminators which emit light in different directions are required. For this reason, such image processing apparatuses are large. Also, it is necessary to previously and accurately position the workpiece and the illuminators. For this reason, such previous accurate positioning will take time and manpower. In addition, because it is necessary to hold the workpiece at rest during image capture, the images are necessarily captured without camera shake. For these reasons, photometric stereo is mainly used for image inspection which needs height information, and is not used for readers which read a shadow of a symbol such as handheld optical information reading device. In other words, there is no reason to use photometric stereo, which estimates height information, in devices which do not need height information. By the above reasons, the photometric stereo is not employed in a small portable handheld optical information reading device.

Contrary to this, because the illuminator 40 which includes a plurality of lighting devices 43 arranged in ring shapes around the optical axis of the image capture device 21 is accommodated in the housing 10 in the handheld optical information reading device 100 according to this embodiment, the handheld optical information reading device 100 can include illumination for photometric stereos but is still portable.

In addition, in order to prevent camera shake when images of a workpiece are captured, the reading opening 13 which is surrounded by the lighting devices 43 is formed to be in direct contact with the surface of the workpiece so that the handheld optical information reading device 100 is easily held during the image capture.

In addition, exposure time is reduced in order to capture images so that total image processing time can be reduced. Also, a light amount of the illumination is increased so that directionally-illuminated images can be captured sufficiently bright even when exposure time is reduced.

In this embodiment, increased driving currents are applied to the LEDs in the lighting devices 40. Generally, driving circuits which drive LEDs have their rated current. If the rated current of a driving circuit is increased, the driving circuit is necessarily redesigned. In this embodiment, a driving circuit which drives the LEDs is designed to be able to simultaneously light up all the lighting devices, in other words to simultaneously apply currents to all the lighting devices when a fully-illuminated image is captured (that is, when an image is captured with light emitted by all the lighting devices). When a directionally-illuminated image is captured, the driving circuit is required to light up only LEDs that correspond to one of the illumination directions. That is to say, when lighting up only LEDs that correspond to one of the illumination directions (when a directionally-illuminated image is captured), the driving circuit can add an amount of current that can be applied to the other LEDs if a fully-illuminated image is captured. For this reason, when a directionally-illuminated image is captured, a larger amount of current than fully-illuminated image capture can be applied to LEDs that correspond to one of the illumination directions. Correspondingly, the image can be captured with a larger amount of light. As a result, the exposure time can be reduced.

In the case in which photometric stereo which is complicated processing is used for image processing prior to reading, processing time will be longer as compared with typical symbol reading. Accordingly, processing time from image capture (scanning) of a symbol to output of the reading result (decoding) correspondingly will be longer, and the response will be slow. To address this, photometric stereo is used only for a workpiece that is placed close to the reader and is not used for a workpiece that is placed at an intermediate or long distance. That is, photometric stereo is selectively used depending on the distance between the reader and a workpiece to suppress response reduction. The structures are now described in more detail.

Figure 18:
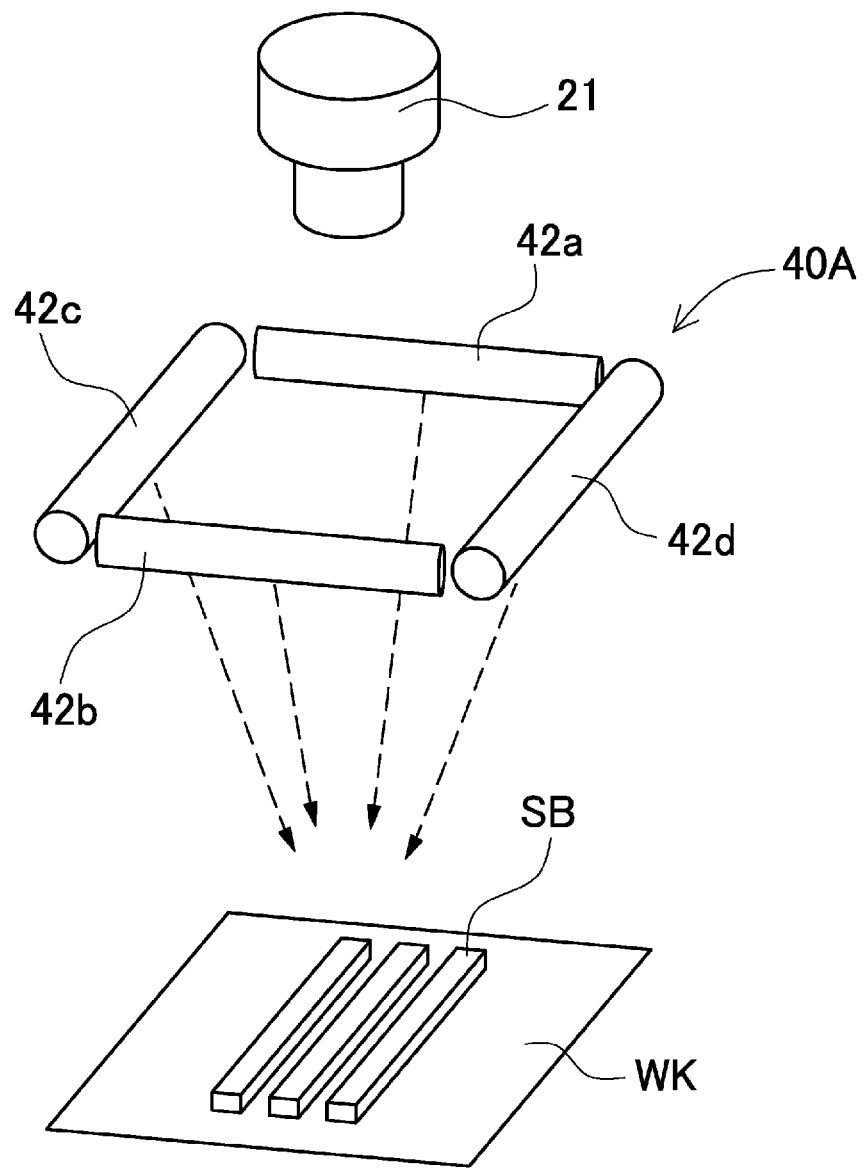
FIG. 18 is a perspective view showing an illuminator which includes lighting devices arranged on a rectangular line.
Figure 19:
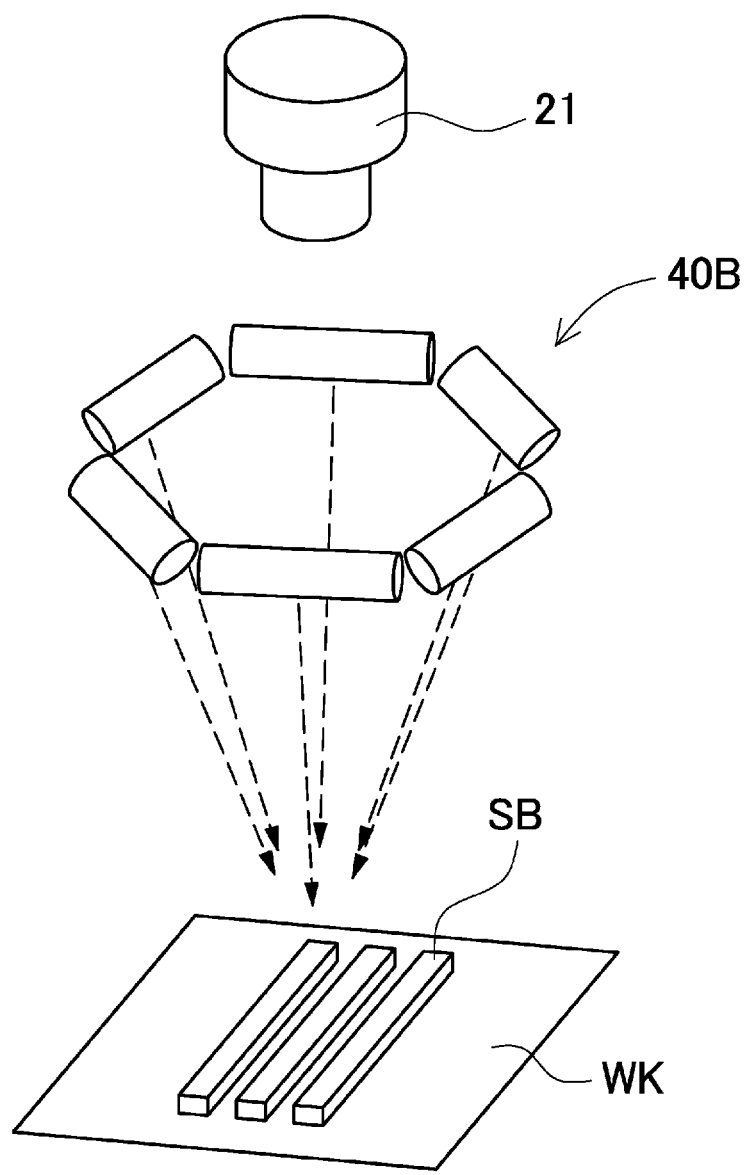
FIG. 19 is a perspective view showing an illuminator which includes lighting devices arranged on a hexagonal line.
Figure 20:
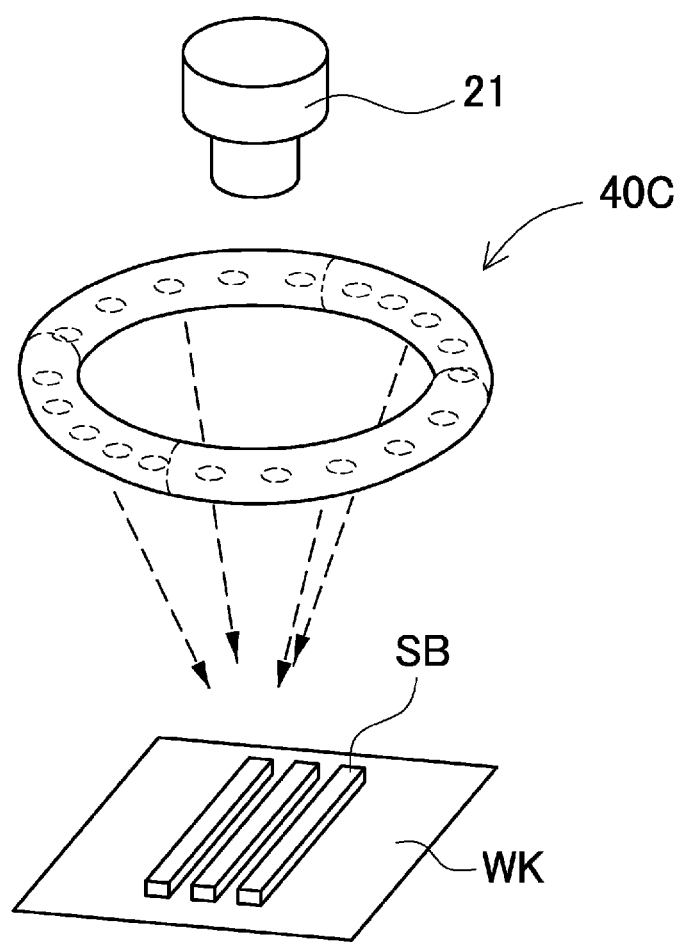
FIG. 20 is a perspective view showing an illuminator which includes four lighting devices arranged on a circular line.
Figure 21:
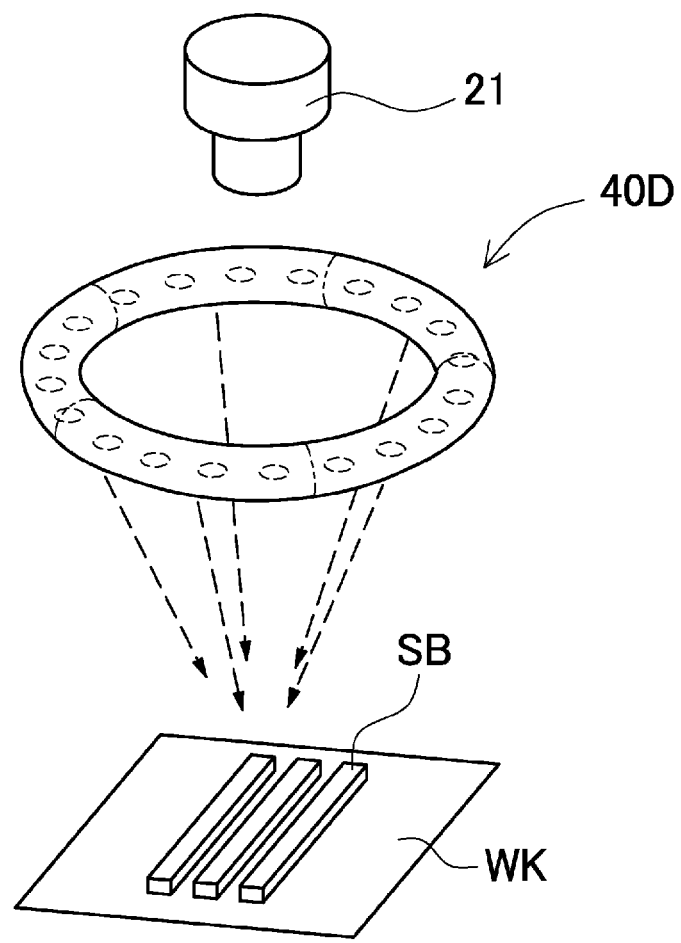
FIG. 21 is a perspective view showing an illuminator which includes five lighting devices arranged on a circular line.
Figure 22A:
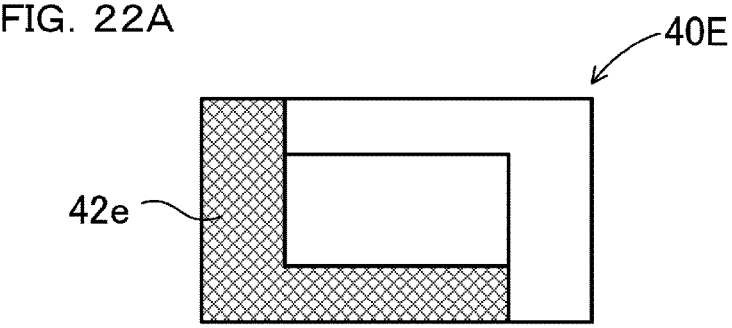
FIG. 22A is a schematic view showing an illuminator according to a modified embodiment in which its lower-and-left part is lighted up.
Figure 22B:
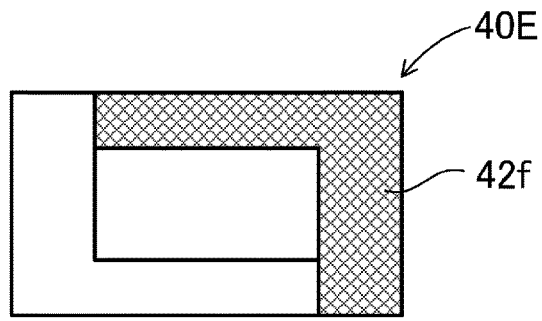
FIG. 22B is a schematic view showing the illuminator according to the modified embodiment in which its upper-and-right part is lighted up.

A lighting device 40A which includes the upper-side device 42a, the lower-side lighting device 42b, the right-side lighting device 42d, and the left-side lighting device 42c is used as the illuminator 40 for photometric stereo according to this embodiment. The upper-side device 42a, the lower-side lighting device 42b, the right-side lighting device 42d, and the left-side lighting device 42c are arranged on a rectangular line as shown in FIG. 18. However, the lighting devices according to the present invention are not limited to rectangular arrangement. They can be arranged in any arrangement which can suitably realize photometric stereo. The lighting devices of an illuminator 40B can be arranged in a polygonal shape such as a hexagonal shape as shown in FIG. 19. Alternatively, the lighting devices of an illuminator 40C can be arranged in a circular shape as shown in FIG. 20. The illuminator which has a circular shape is not limited to such four-part arrangement. An illuminator 40D is constructed of five lighting devices as shown in FIG. 21. The illuminator can be constructed of five or more lighting devices, or three or less lighting devices. The minimum of the number of lighting devices in illuminator is two. For example, an illuminator 40E shown in FIGS. 22A and 22B is constructed of two L-shaped lighting devices which are arranged upper-right and in lower-left parts in a rectangular shape. The L-shaped lighting devices have an L shape which is formed by connecting two adjacent sides of the rectangular shape at a connection corner to each other. That is, the illuminator 40E is constructed of the upper-right and in lower-left lighting devices 42e and 42f shown in FIGS. 22A and 22B, respectively. Two Images each of which includes X and Y directional components can be captured with light from the illuminator 40E. Accordingly, X- and Y-directional inclination images can be obtained by a common image filter. Directions of arrangement of pixels in the image sensor of the image capture device 21 preferably correspond to illumination directions of the illuminator. That is because images can be easily synthesized.

The illuminator 40 includes a plurality of lighting devices 43 which are arranged on a circular or rectangular line extending around the optical axis of the image capture device 21. An area surrounded by the lighting devices 43, which are arranged on a circular or rectangular line, serves as the reading opening 13.

Reading Supporter 15

A reading supporter 15 is preferably arranged in proximity to the reading opening 13 as shown in FIG. 7. The reading supporter 15 includes at least two supporting points to be in contact with the surface of an object which includes the symbol to be read outside of the reading opening 13, and protrudes outside relative to the lighting devices 43. The supporting points are preferably arranged on the circumference of a circle or a side of a rectangle of the reading opening 13 which has a circular or rectangular shape. Generally, photometric stereo is considered unstable for image capture of moving object or with camera shake. Although the reader is portable, the supporting points stably hold the reader when the reader is pressed against the object so that three-dimensional stereo images can be captured without camera shake and a symbol in the images can be read. It is noted that the supporting points are not necessarily protrude relative to the lighting devices and may be arranged coplanar with the lighting devices.

Also, the reading supporter 15 is not necessarily in contact with the surface of a workpiece when images of the workpiece are captured. Users can capture images of a workpiece which include a symbol to be read can be captured while holding the reader with their hand without bringing the reading supporter in contact with the surface of the workpiece depending on the type of the workpiece. For example, in the case in which the reader reads a symbol which is not formed by DPM but is printed on a surface of a workpiece or a stick-on tag applied on a surface of a workpiece, photometric stereo is not required, in other words, such a symbol can be read by typical reading processing. In this case, the reading supporter is not required to contact the surface of the workpiece. Users can bring the entire surface of the reading opening 13 in contact with the workpiece. Also, users can bring only two supporting points in contact with the workpiece. For example, in the case in which users bring two supporting points, which serve as a fulcrum, in contact with a workpiece which include a symbol and presses the handheld optical information reading device 100 against the workpiece, even if the reader is likely to swing in a direction perpendicular to a straight line which extends between the two supporting points, it is relatively easy for users to hold the reader at the moment of image capture without swing of the reader in a direction about one axis (the straight line). Also, a small amount of swing of the reader in a direction about one axis (the straight line) will not affect photometric stereo processing so much. For this reason, the symbol can be sufficiently accurately read.

Cover 60

Figure 23:
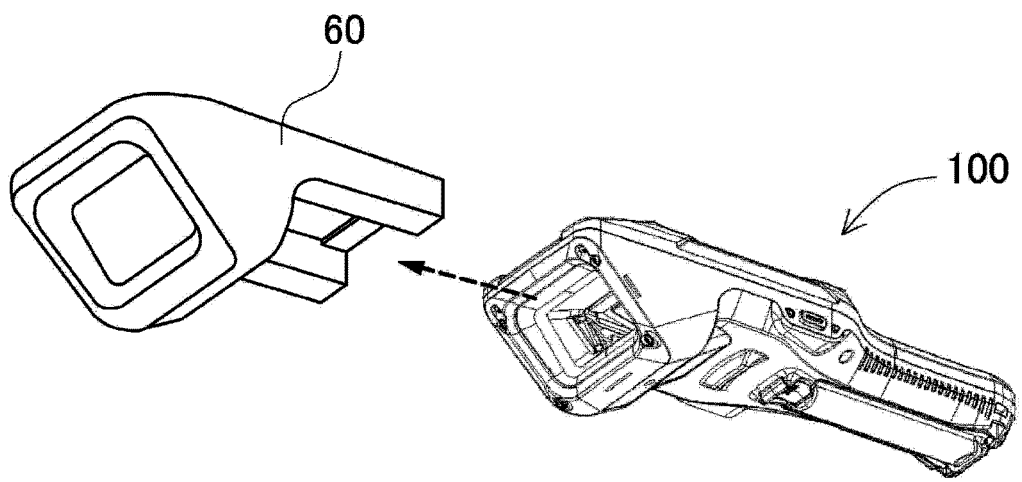
FIG. 23 is a perspective showing a cover which is removed from handheld optical information reading device.

The reading supporter 15 is formed by a material which has a higher friction coefficient than the housing 10. The reading supporter 15 is preferably formed of an elastic material. The reading supporter 15 may be an elastic member which at least partially covers the housing 10. FIG. 23 shows a cover 60 as an exemplary cover which covers and protects the handheld optical information reading device 100. Because a part around the reading opening 13 of the housing 10 is covered by the cover 60 which is formed of an elastic material (e.g., rubber) as shown in FIG. 23, the handheld optical information reading device 100 can be protected from an impact when dropping. If the reading supporter is formed of a hard material which forms the housing, a surface of a workpiece may be damaged when the reading opening is pressed against the surface of the workpiece. Contrary to this, the reading supporter which is formed an elastic material having elasticity or flexibility can prevent such damage so that the work-piece surface can be protected. Such an elastic material has a higher friction coefficient than a resin which forms the housing 10. Accordingly, a frictional resistance of the reading supporter which is formed of an elastic material becomes high when the reading opening 13 is pressed against the surface of a workpiece which includes a symbol to be read. As a result, users can stably hold the reader. Because the protection elastic member also serves as the reading supporter which prevents camera shake during image capture of a symbol, the number of part can be reduced.

Reflector 46

Figure 24:
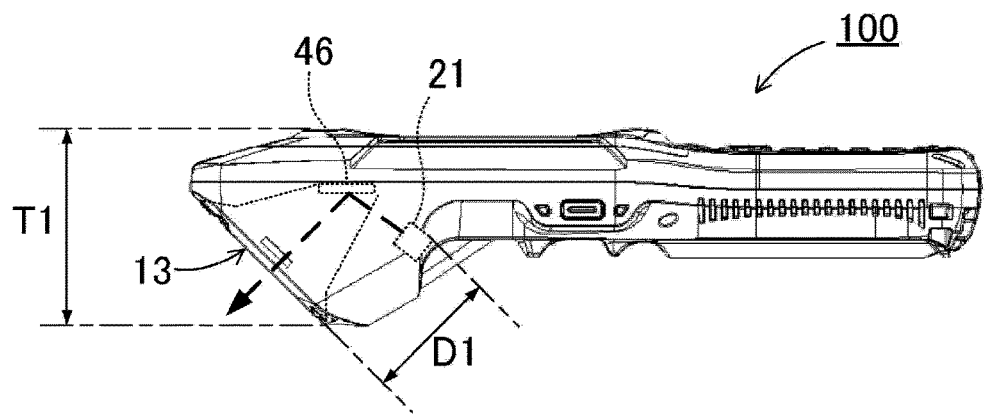
FIG. 24 is a cross-sectional view showing the handheld optical information reading device according to the first embodiment.

The reflector 46 is arranged inside the reading opening 13 and reflects the optical axis as shown in FIG. 24. An optical path length can be increased by reflecting the optical axis, and a focal distance can be longer. Accordingly, a narrow-angle lens can be used to capture images. In typical handheld optical information reading device, a working distance, which is a distance between a symbol to be read and the handheld optical information reading device, changes depending on their working environments. For example, it is satisfied if a desktop handy scanner which is not required to be carried by users and is used on desks can read symbols which are placed at a short distance away from the desktop scanner. Contrary to this, handheld optical information reading device (e.g., handy terminal which is carried by users) is occasionally required to read a symbol on an object which is placed at a large distance away from the handheld optical information reading device such as a corrugated cardboard box which is placed high on other stacked corrugated cardboard boxes in a warehouse. In this case, in order to selectively read a distant target symbol from a number of symbols, a narrow-angle camera (camera having a narrow angle of view) is required to capture images from the image sensor in high resolution which allows the distant target to be read. On the other hand, handheld optical information reading devices are also required to read symbols which are placed at a short distance away from a camera. However, such a narrow-angle camera has a long focal distance. For this reason, in order to capture an image of an object which is placed near the camera, the optical path length is necessarily long.

Figure 25:
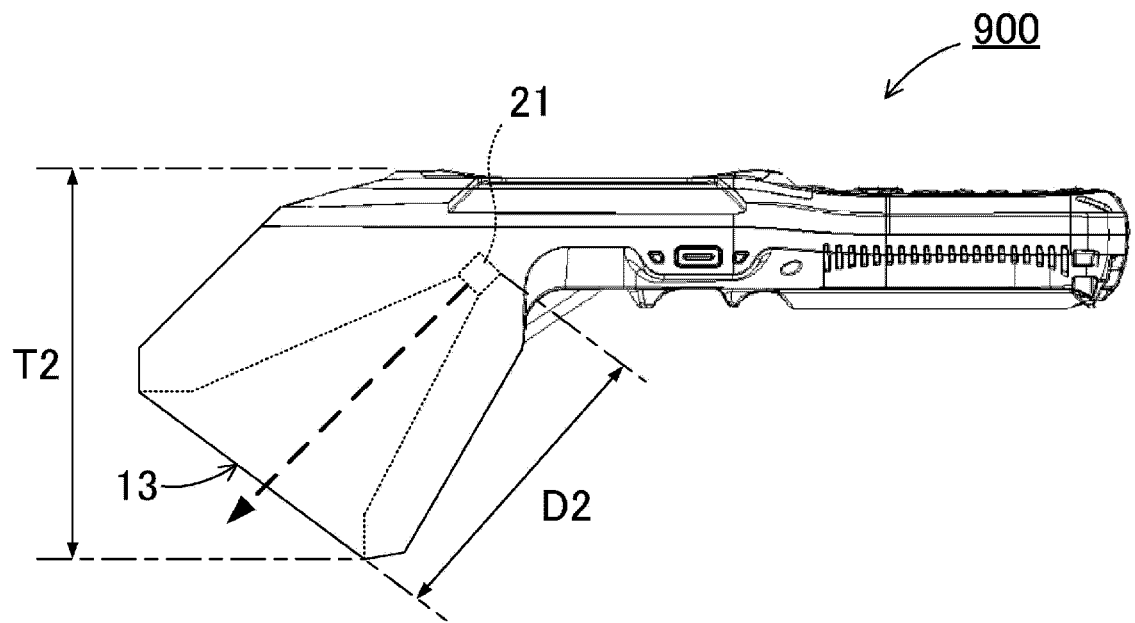
FIG. 25 is a cross-sectional view showing a handheld optical information reading device of a comparative example.

If an optical axis of an image capture device 21 directly extends to a reading opening 13 without the reflector as in a handheld optical information reading device 900 of a comparative example shown in FIG. 25, this reading opening 13 necessarily has a deep depth D2 in order to provide a certain optical path length to the image capture device 21. In other words, this handheld optical information reading device 900 has a large thickness T2. Accordingly, the reader will be large and be inconvenient when carried by users. In addition, because an end part of the handheld optical information reading device 900 is heavy, handling of this handheld optical information reading device 900 will be hard when users use it with their hands.

Contrary to this, because the reflector 46 is arranged at a midpoint of the optical path to the image capture device 21 in this embodiment as shown in FIG. 24, the optical path length can be increased without increasing a thickness T1 of the handheld optical information reading device 100. In other words, the reading opening 13 can have a small depth D1. Accordingly, the handheld optical information reading device 100 will not be large and can be easily carried. In addition, handling of the handheld optical information reading device 100 can be improved by a lightweight end part of the handheld optical information reading device 100. As a result, the operability of the handheld optical information reading device 100 can be improved.

Figure 26:
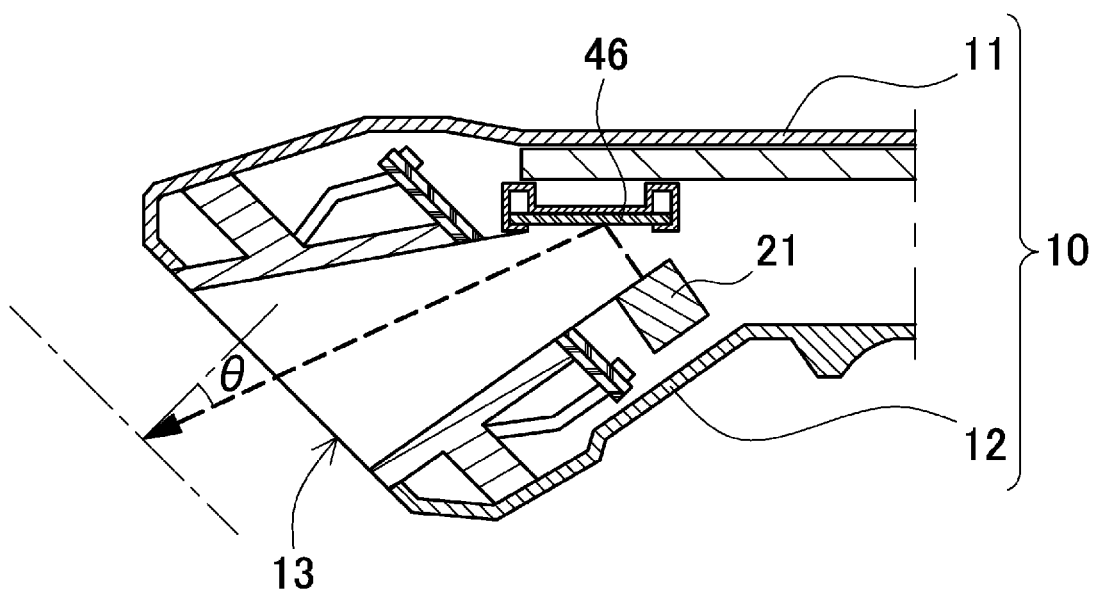
FIG. 26 is an enlarged cross-sectional view illustrating an inclination angle of an reading opening with respect to the optical axis.
Figure 27:
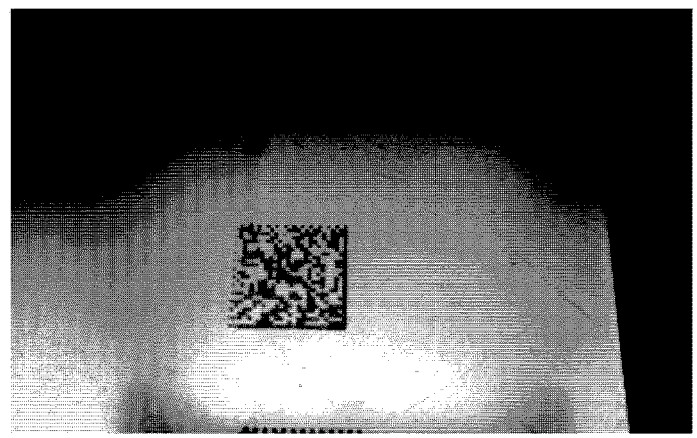
FIG. 27 shows an image in which a diffusion plate can be seen in uniform illumination.
Figure 28:
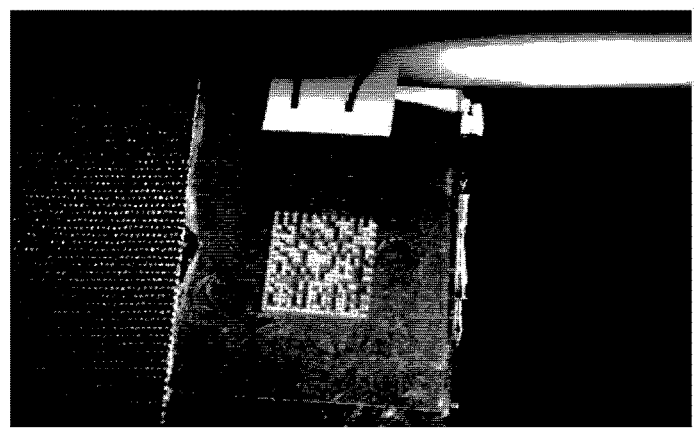
FIG. 28 shows an image in which specular reflection is suppressed in uniform illumination.
Figure 29:
FIG. 29 shows an image in which specular reflection occurs in uniform illumination.

As discussed above, the reading opening 13 is opened in a slanting direction with respect to the housing 10. In other words, the normal to a surface which defines the reading opening 13 is inclined at an angle θ with respect to the optical axis of the image capture device 21 as shown in FIG. 26. According to this inclination arrangement, when an object to be read is irradiated with illumination light by the illuminator 40, images of the object can be captured without reflection of the image capture device 21 in the illumination light dissimilar to a case shown in FIG. 27. Even in the case in which a symbol is irradiated with coaxial illumination light, the inclination arrangement can prevent specular reflection of the coaxial lighting device which may reduce visibility of the symbol dissimilar to a case shown in FIG. 29 so that the symbol can be clearly seen as shown in FIG. 28. In this embodiment, the inclination angle is approximately 15°. In addition, the diffusion plate 45 is asymmetrically formed in the vertical direction as shown in FIG. 9. This asymmetrical shape of the diffusion plate 45 can suppress specular reflection of illumination light. Additionally, the light-shield can be black or the like. In this case, stray light can be reduced.

Second Embodiment

Figure 30:
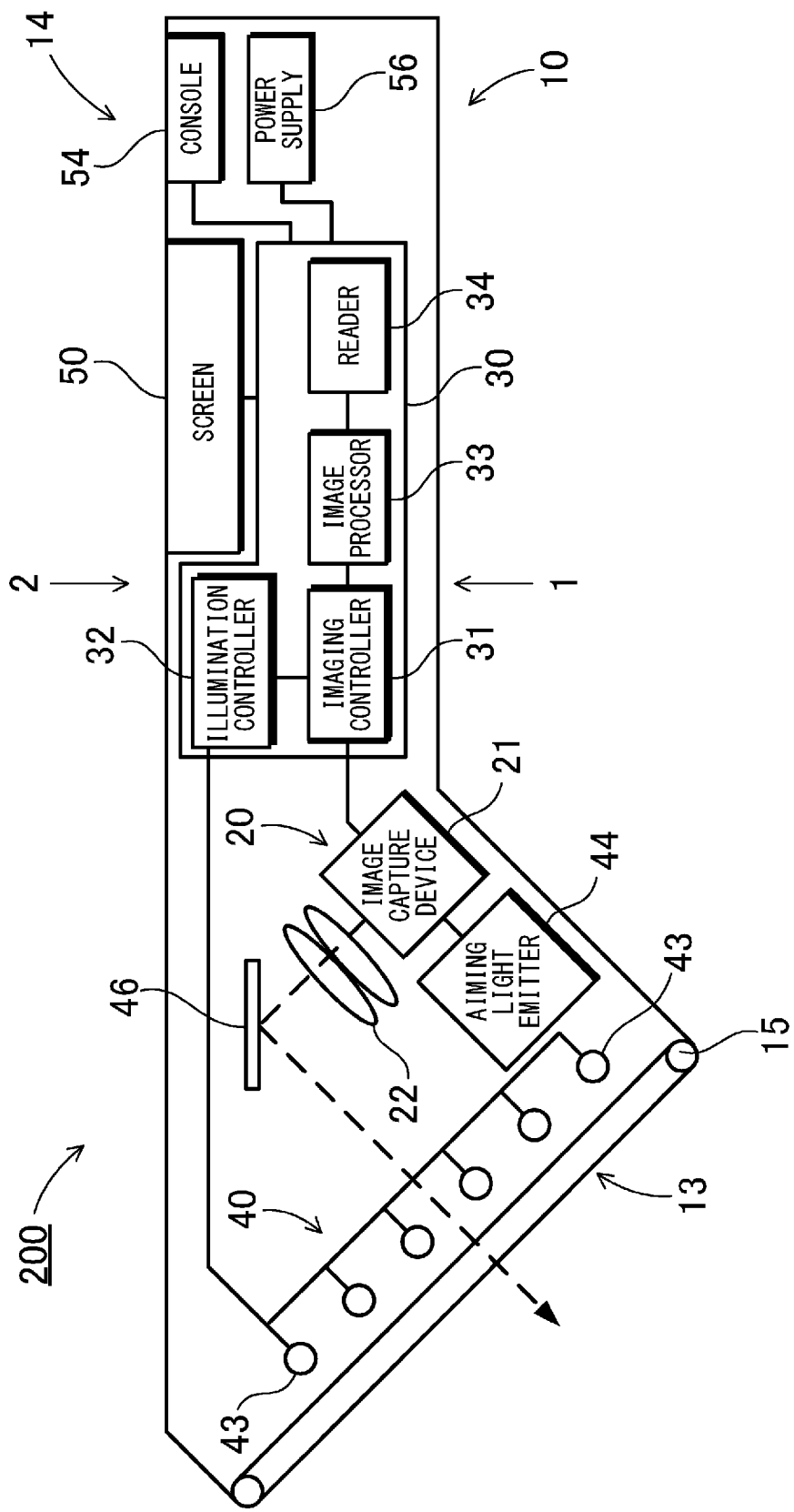
FIG. 30 is a block diagram showing a handheld optical information reading device according to the second embodiment which includes an aiming light emitter.

The handheld optical information reading device can include a laser device, LED, or the like which emits aiming light whereby showing an image capture area of the image sensor 51. Users can know the readable area from the aiming light. A handheld optical information reading device 200 according to a second embodiment shown in FIG. 30 includes an aiming light emitter 60 which emits aiming light. The aiming light forms a spot or a light pattern (e.g., cross or line) which is formed by a point source of light (e.g., semiconductor laser) to show a reading position of the reader 200. In the case in which the aiming light forms a spot, a laser pointer can be used. In the case in which the aiming light forms a pattern, a mask can be used. Alternatively, a light-scanning system is used which directs laser light so that the laser light moves along a desired pattern. A pattern which is formed by aiming light preferably includes a horizontal line. Such a pattern helps users to estimate a scanning line which will run on a bar code. As a result, users can easily and visually grasp an object to be scanned. In the case in which a vertical line is added to the midpoint of the horizontal line whereby forming a cross, users can easily grasp the center of a scanning line. The cross of aiming light preferably has a transversely elongated cross shape which includes a long horizontal line and a short vertical line. Such a transversely elongated cross shape helps users to direct a scanning line along a transversely elongated bar code. The aiming light which is emitted by the aiming light emitter 60 may be also used as the illuminating light (reading light) when a bar code is read.

Image-Capture Sequence

Figure 31:
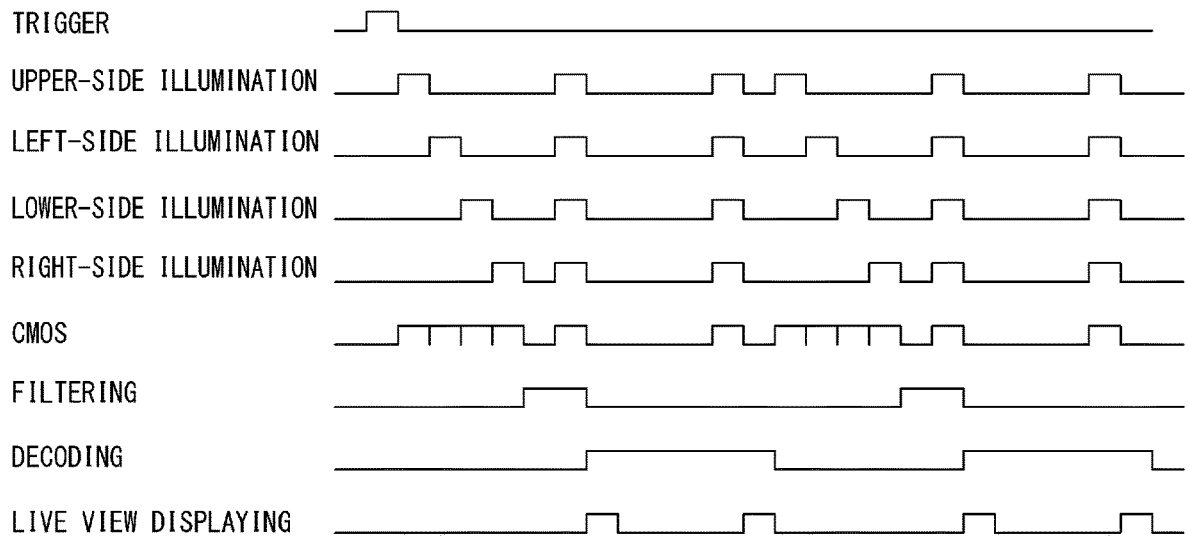
FIG. 31 is a timing chart illustrating an image capture sequence of the handheld optical information reading device shown in FIG. 1.
Figure 32:
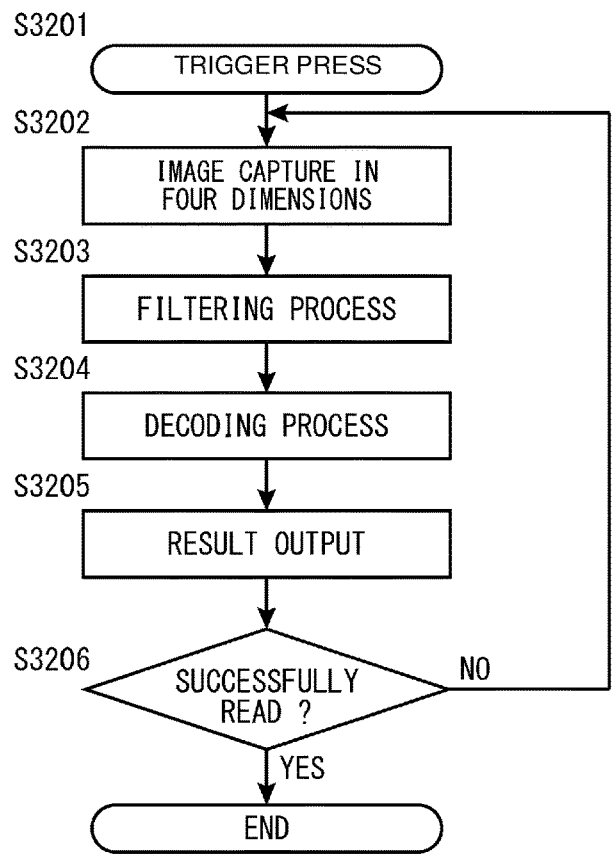
FIG. 32 is a flowchart illustrating procedure of reading a symbol in images which are captured in photometric stereo.

Image-capture sequence which captures images is now described with reference to a timing chart of FIG. 31 and flowcharts of FIGS. 32 and. 33. In this embodiment, photometric stereo processing and live-view processing are executed in parallel. That is, directionally-illuminated images which include a symbol are captured so that the outline of the symbol is extracted, and the symbol is read so that the reading result is provided in the photometric stereo process, while a captured image which includes the symbol is displayed as a real-time image on the screen 50 in the live-view process.

Photometric Stereo Processing

The photometric stereo processing is first described with reference to the flowchart of FIG. 32. The trigger switch is first pressed, and reading processing is started in Step S3201. Subsequently, the directionally-illuminated images are captured when the symbol is irradiated with light in different directions in Step S3202. In this embodiment, the lighting devices 43 which are arranged on the upper, lower, left, and right sides are controlled and selectively successively lighted up by the illumination controller 32 so that images are correspondingly captured by the image capture device 21 in accordance with illumination timing shown in FIG. 31. FIGS. 10A to 10D show the lighting devices 42 as the lighting devices 43 in which one of lighting devices 42 is lighted up. Accordingly, four directionally-illuminated images are captured every time the symbol is selectively successively irradiated with light in four different directions.

Subsequently, a filtering process is executed in Step S3203. More specifically, the captured directionally-illuminated images are subjected to filtering of the photometric stereo.

Subsequently, a decoding process is executed in Step S3204. More specifically, the symbol is decoded from the filtered and synthesized directionally-illuminated image.

Subsequently, a decoding result is provided in Step S3205. Subsequently, it is determined whether the reading result is successfully provided in Step S3206. If the reading result is successfully provided, the reading processing ends. If not, in other words, if the reading fails or a successful reading result is not provided within a predetermined time period (timeout), the procedure returns to Step S3202 so that the processes are repeated.

Live-View Processing

Figure 33:
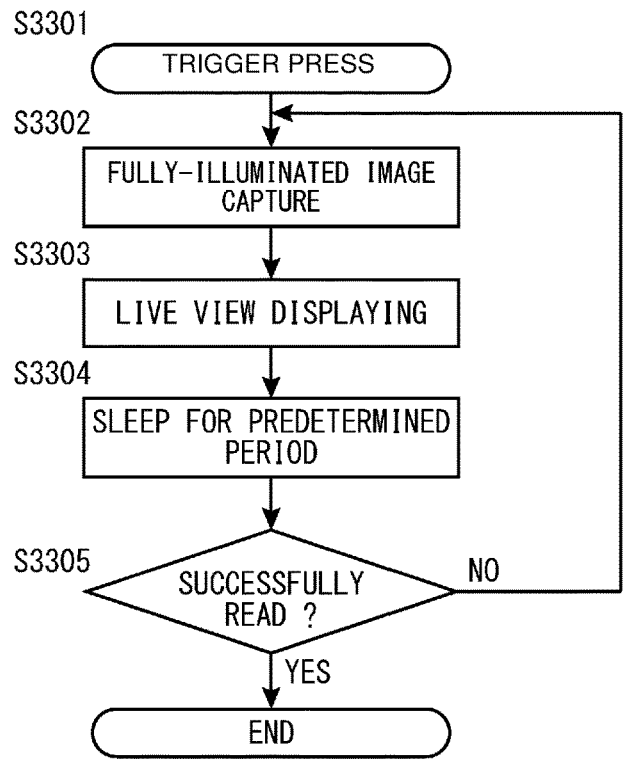
FIG. 33 is a flowchart illustrating procedure of reading a symbol in images which are captured in multi-angle illumination.
Figure 34:
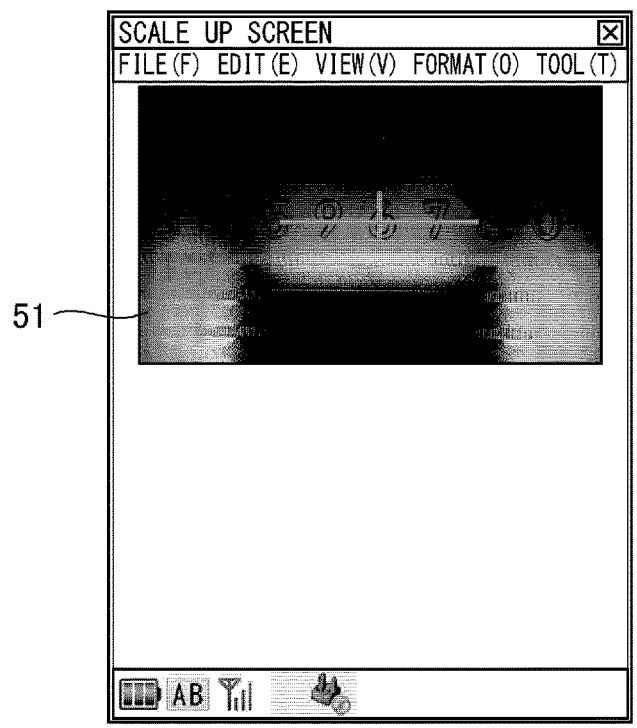
FIG. 34 shows a live view image.

The live-view processing is executed while the filtering and decoding processes are executed in the photometric stereo processing. An image (fully-illuminated image) is captured when all the lighting devices 43 are simultaneously lighted up, and is displayed on the screen 50 in the live-view processing. The fully-illuminated image is updated in real time like moving image. The live-view processing is described with reference to the flowchart of FIG. 33. The trigger switch is first pressed in Step S3301. Step S3301 is the same step as Step S3201. Subsequently, a fully-illuminated image is captured when all the lighting devices 43 are simultaneously lighted up in Step S3302. The fully-illuminated image is displayed on the screen 50 in Step S3303. More specifically, the fully-illuminated image is displayed on a real-time image display area 51 as shown in FIG. 34. Subsequently, a sleep process is executed for a predetermined time period in Step S3304. Subsequently, it is determined whether the reading processing is successfully executed in Step S3305. If the reading processing is successfully executed, the live-view processing ends. If the reading processing fails or a timeout occurs, the procedure returns to step S3302 and repeats the steps. Step S3305 is the same step as Step S3206. If the symbol is successfully read, the live view-processing correspondingly ends. If the reading processing fails, the live-view processing continues.

The fully-illuminated image is periodically captured for live view. The capture of the fully-illuminated image is asynchronous to the filtering and decoding processes in the photometric stereo processing. It is noted that the fully-illuminated image is captured when the directionally-illuminated image is not captured in order to avoid simultaneous image processing of both the fully-illuminated image and the directionally-illuminated image. Two fully-illuminated images are captured in a cycle in which four directionally-illuminated images are captured in the exemplary timing chart of FIG. 31. However, one fully-illuminated image, or three or more fully-illuminated images may be captured in the cycle. The number of fully-illuminated images which are captured in the cycle can be determined depending on a frame rate required for live view and the capacity of the general processor 30. In order to display the fully-illuminated image in real time, the fully-illuminated image is updated a 10 fps or more, for example.

Live-View Image

As discussed above, the live-view image is displayed during filtering and decoding processes. When images of a symbol are captured in photometric stereo, users hold and place the handheld optical information reading device over a workpiece which includes the symbol. Accordingly, users cannot see the symbol.

Figure 35A:
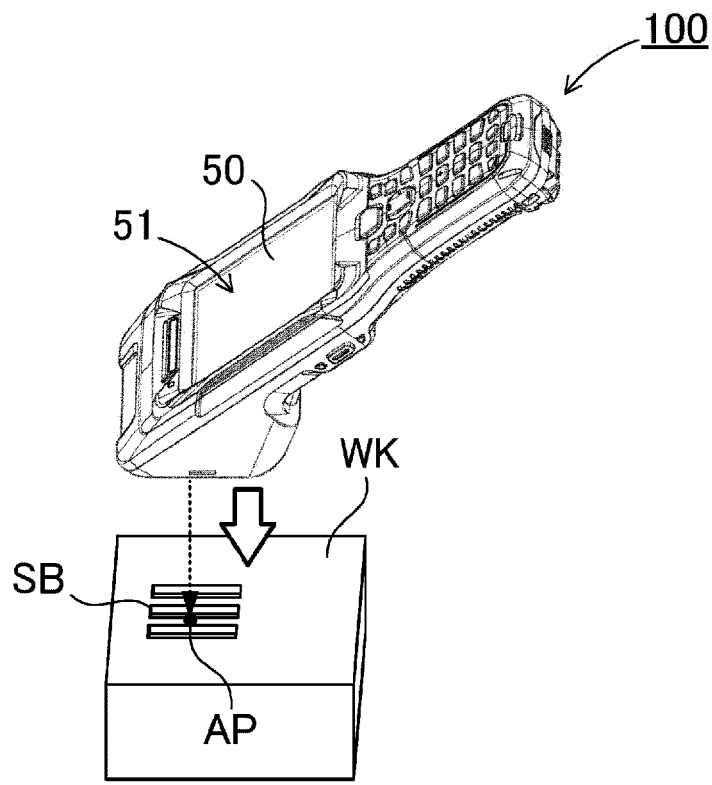
FIG. 35A is a perspective view showing a handheld optical information reading device which is approaching a surface of a workpiece.
Figure 35B:
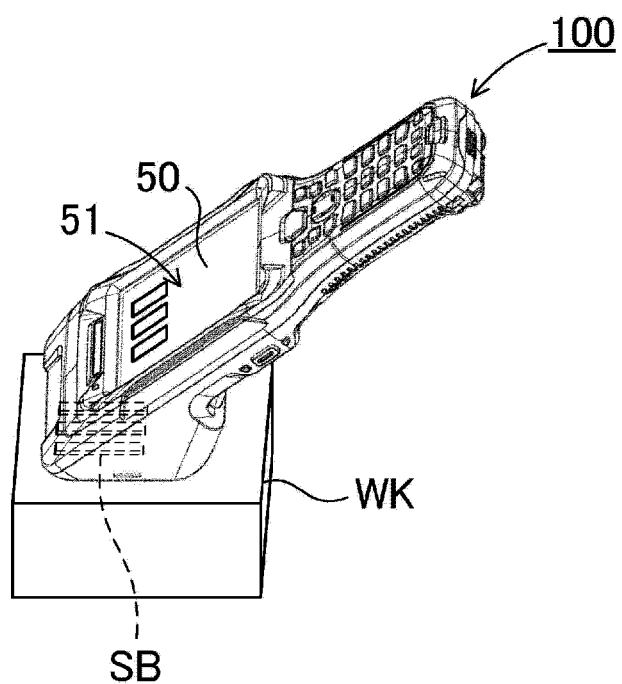
FIG. 35B is a perspective view showing the handheld optical information reading device which has been positioned covering a symbol.

Here, a case is considered where a symbol SB which is formed on a surface of a workpiece WK by DPM is read in photometric stereo process, as shown in FIG. 35A. In order to capture suitable images for photometric stereo, users necessarily place the handheld optical information reading device 100 close to the symbol SB. In this placement, as shown in FIG. 35B, the aiming light which is emitted by the aiming light emitter 60 is hidden inside the reading opening 13 of the handheld optical information reading device 100. Accordingly, users cannot see an aiming position AP. In this case, users cannot easily know whether the handheld optical information reading device 100 is correctly positioned at a suitable position in which images of the symbol SB can be captured. To address this, the live-view image is displayed in real time on the screen 50 by the live-view processing. As a result, users can see the live-view image displayed on the screen 50 and correctly position the handheld optical information reading device 100 at a suitable position. A fully-illuminated image which is captured when all the lighting devices 43 are lighted up is preferably displayed as the live-view image. That is because the directionally-illuminated image which is captured with light in a limited direction in photometric stereo processing is not considered suitable for checking of entire placement of the symbol SB. An outline image is formed by image processing which limitedly extracts directionally-illuminated images as discussed later. In other words, a field of view is narrow in such an outline image. From this viewpoint, outline images may not be suitable for checking of placement of the symbol SB. For these reasons, directionally-illuminated images are not displayed on the screen in image capture of a symbol but the fully-illuminated image is separately captured and updated in real time. In this embodiment, because a fully-illuminated image which is captured with light from all the lighting devices 43 in different directions is displayed on the screen, users can easily check workpiece WK at its actual position. As a result, users can properly position the symbol SB while seeing the workpiece WK.

Real-Time Image Display Area 51

Figure 36:
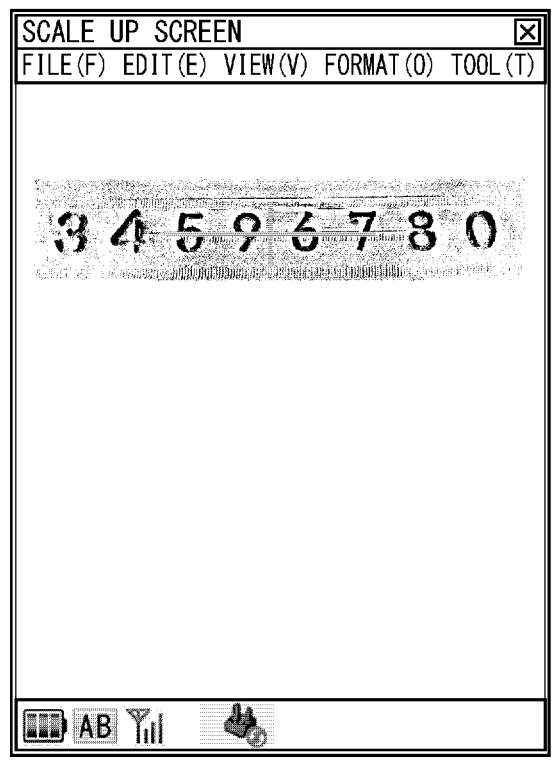
FIG. 36 illustrates a screen on which an image captured in photometric stereo is displayed.

FIG. 34 shows a real-time image which is displayed on the screen 50. The illustrated real-time image display area 51 which displays a real-time image is arranged on the upper side of the screen 50. According to this arrangement, a real-time image is displayed at a position corresponding to the image capture device 21 which is accommodated in the housing 10. Even when users hold the handheld optical information reading device 100 so as to hide the symbol SB inside the handheld optical information reading device 100 as shown in FIG. 35B, users will feel as if they see the symbol SB passing through the handheld optical information reading device 100. As a result, users can intuitively grasp a position of the symbol SB. Therefore, the operability of the handheld optical information reading device 100 can be improved. Also, an image which is formed in photometric stereo processing may be displayed on the screen 50 as shown in FIG. 36.

Procedure of Extracting Outline of Symbol in Photometric Stereo

The image processor 33 extracts a symbol from images in photometric stereo and decodes the symbol. An exemplary procedure of extracting outlines of elements CL which form a symbol to be read by using photometric stereo is now described with reference to FIGS. 37 to 43. Each elements CL refers to one cell in the case the symbol to be read is a QR code. In case of bar code, the elements CL refers to one bar, and in case of character string, the elements CL refers to one character (e.g., alphabet).

Inclination is estimated based on variation of brightness in different illumination directions in photometric stereo as discussed above. Generally speaking, because brightness is used for the estimation of inclination in photometric stereo processing, if shadows CS fall on a target object, the estimated inclination will be false. However, the falsely estimated inclination is turned to advantage in this embodiment so that the outlines of elements CL can be extracted.

Principle of Extraction of Outline from Object as Protrusion

Outlines of elements CL can be extracted as protrusions in the outline image as follows:

(1) The shadows CS effect stepped changes in inclination images.

(2) The stepped changes in inclination images are recognized as protrusions by differential calculation in the outline image.

The extraction of outline will be described in detail.

1: Influence of Shadow CS on Stepped Change in Inclination Image

Figure 37:
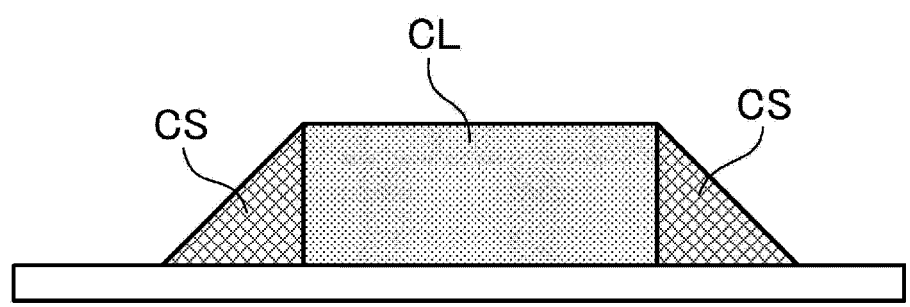
FIG. 37 is a cross-sectional view showing a workpiece which is irradiated with light.
Figure 38:
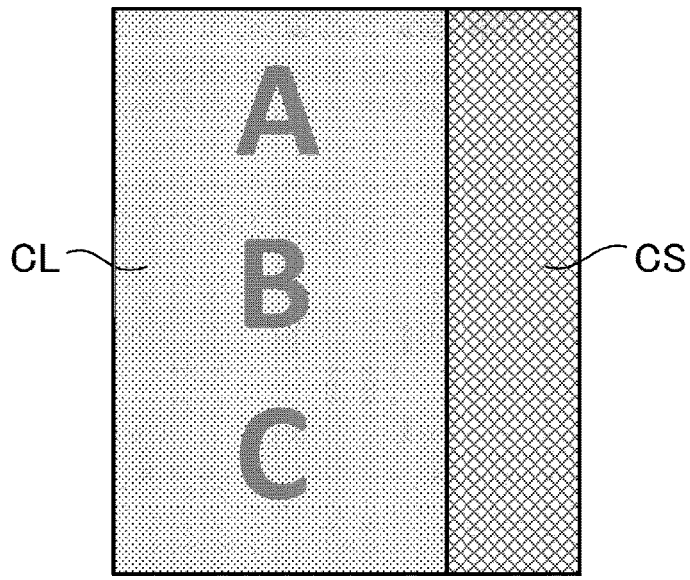
FIG. 38 is a plan view showing the workpiece shown in FIG. 37 which is irradiated with light from the left side.
Figure 39:
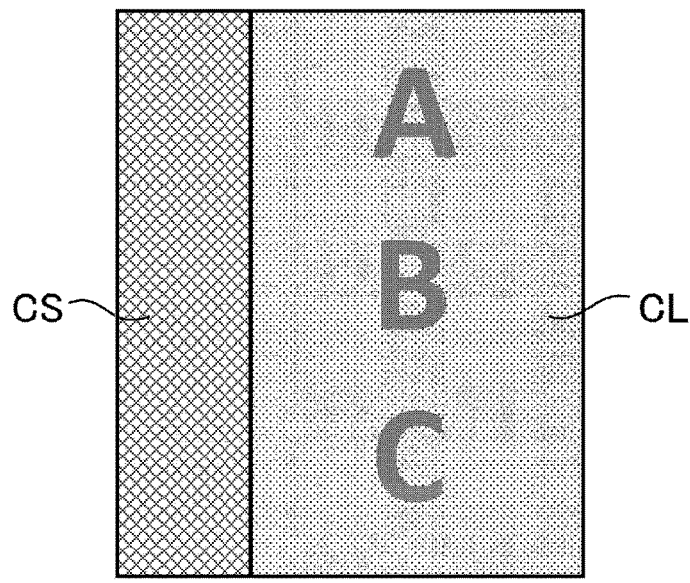
FIG. 39 is a plan view showing the workpiece shown in FIG. 37 which is irradiated with light from the right side.
Figure 40:
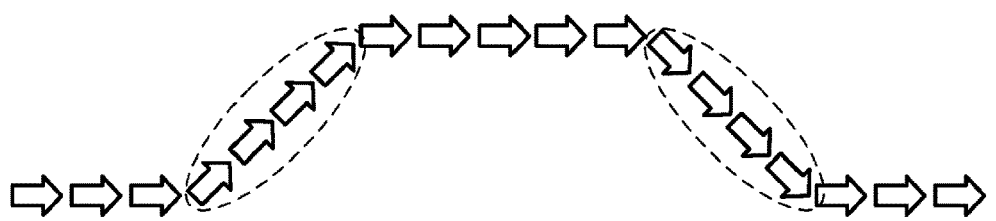
FIG. 40 is a schematic cross-sectional view illustrating estimated inclination in the X direction.

Here, inclination only in the X direction is described for sake of brevity. In this example, an element CL which is included in a symbol to be read has a rectangular shape in section as shown in FIG. 37. FIG. 38 is a top view showing a directionally-illuminated image of the element CL which is irradiated with light from the left as viewed from the top. FIG. 39 is a top view showing a directionally-illuminated image of the element CL which is irradiated with light from the right. FIG. 40 shows a profile of an inclination image which is formed from these directionally-illuminated images in photometric stereo. The profile is represented as estimated inclination in X direction by arrows. It is found that a part of the profile of the inclination image which is enclosed by a broken-line ellipse in FIG. 40 is incorrectly estimated by the influence of the shadow CS.

Figure 41:
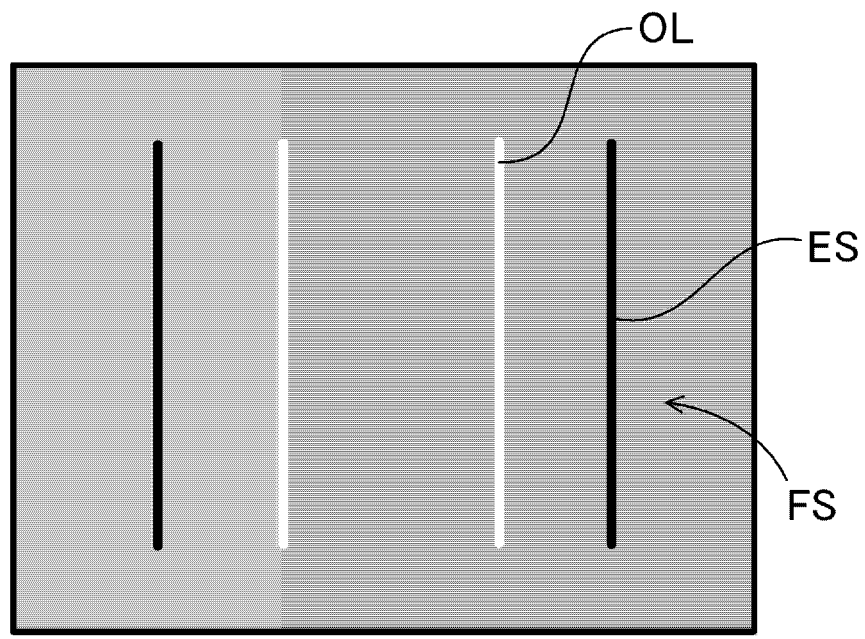
FIG. 41 is a schematic diagram illustrating an outline image which is processed through an algorithm in the X direction.

2: Recognition of Stepped Change in Inclination Image as Protrusions by Differential Calculation in Outline Image The influence of shadow CS on the inclination image is now discussed. Stacking calculation of small protrusions and recesses in image which includes the symbol to be read corresponds to differentiation of the inclination image. That is, an outline-extracted image which represents a contour of surface inclination is created by differentiating normal vectors in pixels of the inclination image in the X direction. FIG. 41 shows the outline-extracted image which is created by differentiating the inclination image shown in FIG. 40. In this outline-extracted image, outlines OL are represented by white lines, and end parts ES of the shadows CS are represented by black lines. A flat surface FS is represented by a gray scale 128.

Figure 42:
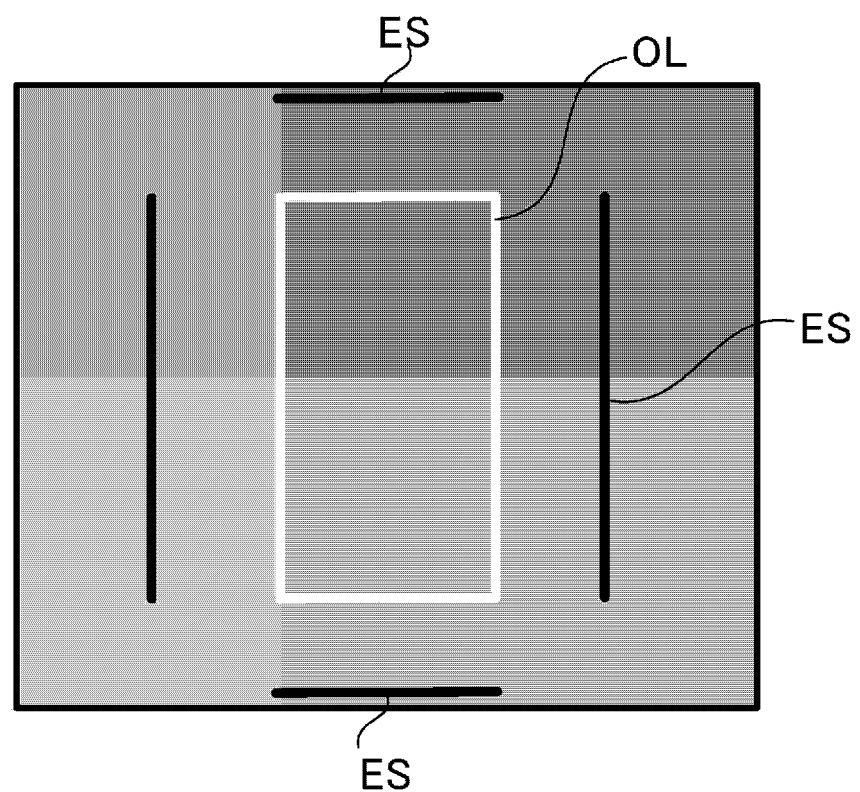
FIG. 42 is a schematic diagram illustrating an outline image which is processed through the algorithm in the X and Y directions.
Figure 43:
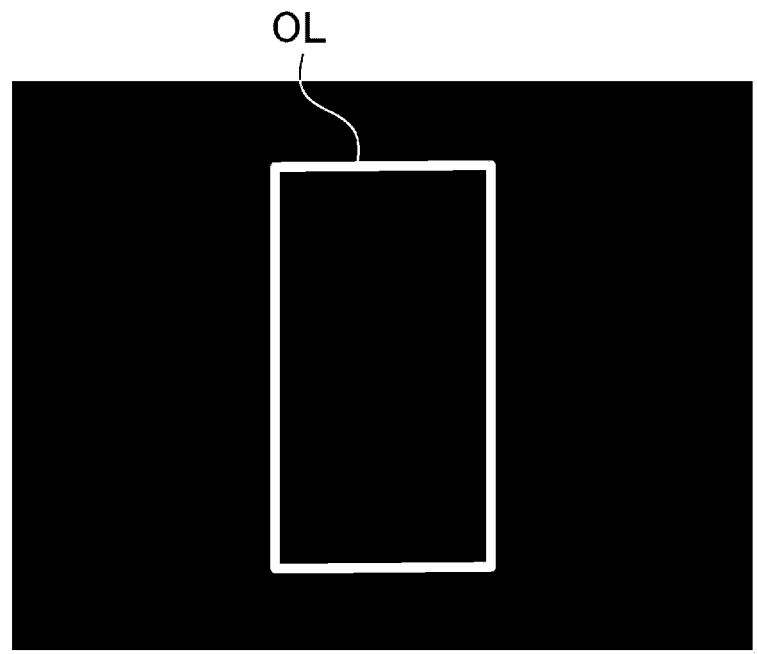
FIG. 43 is a schematic diagram illustrating an image including only an outline.

Although inclination only in the X direction is discussed above, actual outline images are created by X- and Y-directional calculation. FIG. 42 shows an outline-extracted image which is created by X- and Y-directional calculation. The end parts of the shadows CS are unnecessary to read the symbol. For this reason, the end parts of the shadows CS are eliminated by level adjustment. Finally, an outline image which includes only the outline OL of the element CL is created as shown in FIG. 43.

Function of Limiting Image-Processing Area

The reader 34 reads a symbol only in a central part of the image capture area which is extracted by cutting out upper and lower end parts of the image capture area having a predetermined height. Accordingly, the processing time can be shortened by limiting an area to be read but wide view can be provided to easily find a symbol. As a result, user convenience can be improved.

The screen 50 may display an image which includes the upper and lower end parts of the image capture area, which are cut out by the reader 34. In this case, internal processing of the handheld optical information reading device 100 can be faster by partially cutting out of the image but the entire image which includes the cut-out part is displayed on the screen 50 so that good visibility can be provided to users.

For example, in the case in which the decoding process is OCR of a character string, because character strings typically extend in the transverse direction, even if the area to be read is limited in the vertical direction, in other words, even if the upper and lower parts above and under such a horizontally written character string are excluded from the area to be read, the filtering process can be properly applied to the character string area. Also, because a target area to which image processing is applied is limited, the image processing can be simple and faster. In addition, prior to the image processing, only an area of a symbol can be extracted from an image, and the image processing can be applied to only the extracted area. In this case, because parts which are located on the left and right of a character string and are not unnecessary for reading are cut out, the image processing can be much faster.

Automatic on/Off Control of Photometric Stereo

The image processor 33 may not always execute photometric stereo processing but selectively execute photometric stereo processing if necessary. In other words, the image processor 33 can execute photometric stereo processing depending on a symbol to be read. For example, when the symbol includes protrusions or recesses which are formed by DPM, photometric stereo processing is executed, while when the symbol is flat (e.g., a printed symbol), contrast is detected from light reflected on the symbol in typical illumination so that the symbol is read.

Photometric stereo image processing is preferably switched ON/OFF based on a working distance between a symbol to be read and the handheld optical information reading device 100. More specifically, when the working distance is not greater than a predetermined value, photometric stereo image synthesis is executed (ON). When the working distance is greater than the predetermined value, photometric stereo image synthesis is not executed (OFF). Because such high-load photometric stereo image processing is executed only when necessary, processing time can be short. In photometric stereo, two or more images are necessarily captured and an inclination or albedo image is created from the captured images. That is, actual image capture time and image processing time will be longer. For this reason, response time of the handheld optical information reading device 100 from image capture of a symbol to decoded result output will be long. Such long response time may cause response reduction. Also, users are requested to press the reading opening 13 against a surface of a workpiece when images of the workpiece are captured in photometric stereo. In other words, when a working distance is short, the photometric stereo is required, while when the working distance is long, a symbol can sufficiently be read in typical illumination (multi-angle illumination). From this viewpoint, when a working distance is long, a series of processes from image capture to image processing in photometric stereo (hereinafter referred to as "photometric stereo processing") is switched OFF. As a result, the processing time can be reduced. Therefore, response reduction can be suppressed.

Figure 44:
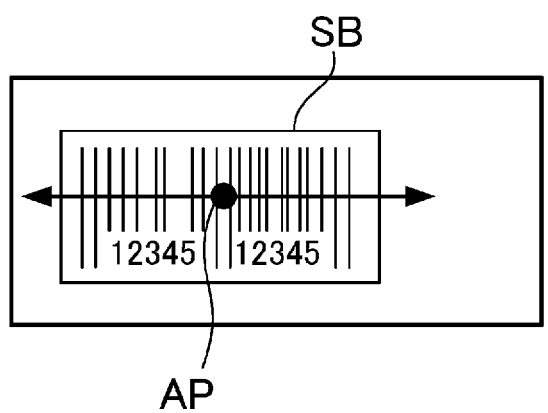
FIG. 44 is a schematic view showing the position of aiming light which changes in accordance with working distance.

It is preferable that photometric stereo image processing is automatically switched ON/OFF depending on working distances. In this case, users are not necessarily switch photometric stereo processing ON/OFF depending on working distances every time a symbol is read. Because such troublesome operation can be eliminated, user-friendly operability can be provided to the handheld optical information reading device. In order to automatically switch photometric stereo image processing ON/OFF, the handheld optical information reading device 100 includes a distance-measuring device that measures a working distance between a symbol to be read and the handheld optical information reading device 100. A ranging sensor such as photoelectric sensor can be used as a distance-measuring device. In the embodiment shown in FIG. 30, the aiming light emitter 60 is arranged in proximity to the image capture device 21. A working distance can be estimated based on a point of aiming light which is emitted by the aiming light emitter 60. More specifically, if a working distance is short, an aiming point AP is slightly shifted leftward with respect to a reference point, and if large the aiming point AP is slightly shifted rightward as shown in FIG. 44. Based on this phenomenon, a working distance is measured by using triangulation. A threshold relating to a working distance which determines whether photometric stereo processing is switched ON can be a value in a range from 50 to 70 mm, for example.

In addition, illumination conditions relating to the illuminator 40 and camera conditions relating to the image capture device 21 (combination of illumination conditions and camera conditions occasionally referred to as image-capture conditions in this specification) can be changed depending on a working distance. Examples of illumination parameters which define the illumination conditions can be provided by illumination directions or lighting pattern selecting which lighting device 43 to switch ON, light amount of the lighting device 43 (i.e., driving current or lighting period of LEDs (e.g., how many seconds LEDs are driven)), and the like. Examples of camera parameters which define the camera conditions can be provided by exposure time, gain, and the like of CMOS. In the case in which illumination conditions or camera conditions are changed depending on working distances, two sets of parameters which include short and long distance parameter sets can be previously prepared, or three sets parameters which include short, intermediate and long distance parameter sets can be previously prepared. Needless to say, four or more sets of parameters may be previously prepared. In this embodiment, three sets parameters which include short, intermediate and long distance parameter sets are previously prepared. After a working distance is estimated, a default set of parameters corresponding to the estimated working distance is first selected to capture an image or images of a symbol in accordance with the selected illumination conditions and camera conditions so that the symbol is read. If the reading fails, another set of parameters is selected so that an image or images of the symbol captured and the symbol is read. This selection will be repeated until the reading is successfully executed.

If measurement of a working distance fails, that is, if the working distance is unknown, one set of parameters is selected from sets of parameters in a predetermined order to read a symbol. For example, a parameter set for short distance is first selected from the three sets of parameters. In other words, image capture and image processing for photometric stereo are first executed.

If the symbol is successfully read, the reading processing ends. If the reading fails, a parameter set for intermediate distance is selected, that is, reading processing that excludes photometric stereo processing is executed. If the reading fails again, a parameter set for long distance is selected so that its reading processing is executed.

Also, two or more different sets of image-capture conditions for photometric stereo can be previously prepared so that image capture and reading processes are executed based on one of the different sets. In this case, another set will be successively selected from the different sets if the reading fails. For example, the illumination controller 32 changes adjustment parameters relating to the second group of lighting devices 42 when lighting up the illuminator 40. The adjustment parameters include at least a characteristic size parameter relating to a character size or dot size of a symbol to be read and an inversion parameter of protrusion/recess of the symbol. The image processor 33 determines the adjustment parameters based on decoded results of a plurality of images that are captured when the symbol is irradiated with light in conditions corresponding to differently controlled adjustment parameters by the illuminator 40. Similarly, parameters relating to characteristic level, offset, noise level, and the like as the image-capture conditions can be changed. In addition, these parameters can be automatically adjusted based on an evaluated result of a captured image. In this case, a symbol can be read in accordance with the parameters which are automatically adjusted depending on situations without users' conscious of troublesome parameter settings.

For example, four sets of parameters are previously prepared depending on four combinations of whether a symbol to be read includes protruding or recessed characters and whether the symbol includes bold or thin characters. Each of the four sets of parameters includes different illumination conditions of the lighting device 43 and camera conditions of the image capture device 21.

That is, the four sets of parameters include a symbol which includes protruding and bold characters, a symbol which includes protruding and thin characters, a symbol which includes recessed and bold characters, and a symbol which includes recessed and thin characters. More specifically, a threshold based on which a value is converted to one or zero (a binary number) as one of the parameters is changed depending on whether the symbol includes protruding or recessed characters. Also, a picture frequency based on which components of an image are extracted is changed depending on whether the symbol includes bold or thin characters. Although a symbol to be read is not limited to a character string, the term protruding "character" and bold "character" are used for ease of understanding whether a symbol to be read protrudes or recessed and whether the symbol is bold (rough) or thin (fine). Accordingly, four directionally-illuminated images are captured by controlling the illumination controller 32 and the imaging controller 31 from one parameter set to another parameter set so that their corresponding outline image is created and reading of the symbol is executed. In a sequence of reading the symbol from the four outline images, if the symbol is successfully read from the created outline image, the successfully read result is provided and the reading processing is terminated without newly creating another outline image. Consequently, users can read even a tough symbol which is difficult to be read by conventional handheld optical information reading devices (e.g., DPM symbol) similarly to typical symbols without entering particular settings.

The present invention is not limited to this. For example, after four outline images are successively created so that the four outline images evaluated, the best outline image which has the highest evaluation value can be selected whereby providing a reading result which is obtained from the best outline image. Alternatively, parameters that can provide successful reading may be automatically searched by successively selecting the four sets of parameters. In the case in which a multi-core CPU is used for the general processor 30, one core can execute recess-type processing (filtering and decoding), while another core can execute protrusion-type processing when a symbol is decoded, that is, different types of processing can be assigned to different cores. In this case, after results are provided by the cores, one of reading results that has higher reading reliability is selected and provided as the decoded result. In particular, filtering is likely to be affected by background noise. From this viewpoint, two or more filtering conditions can be applied to select a more reliable result from two or more results. In this case, the reliability can be improved.

Zoom Lens 22B

Figure 45:
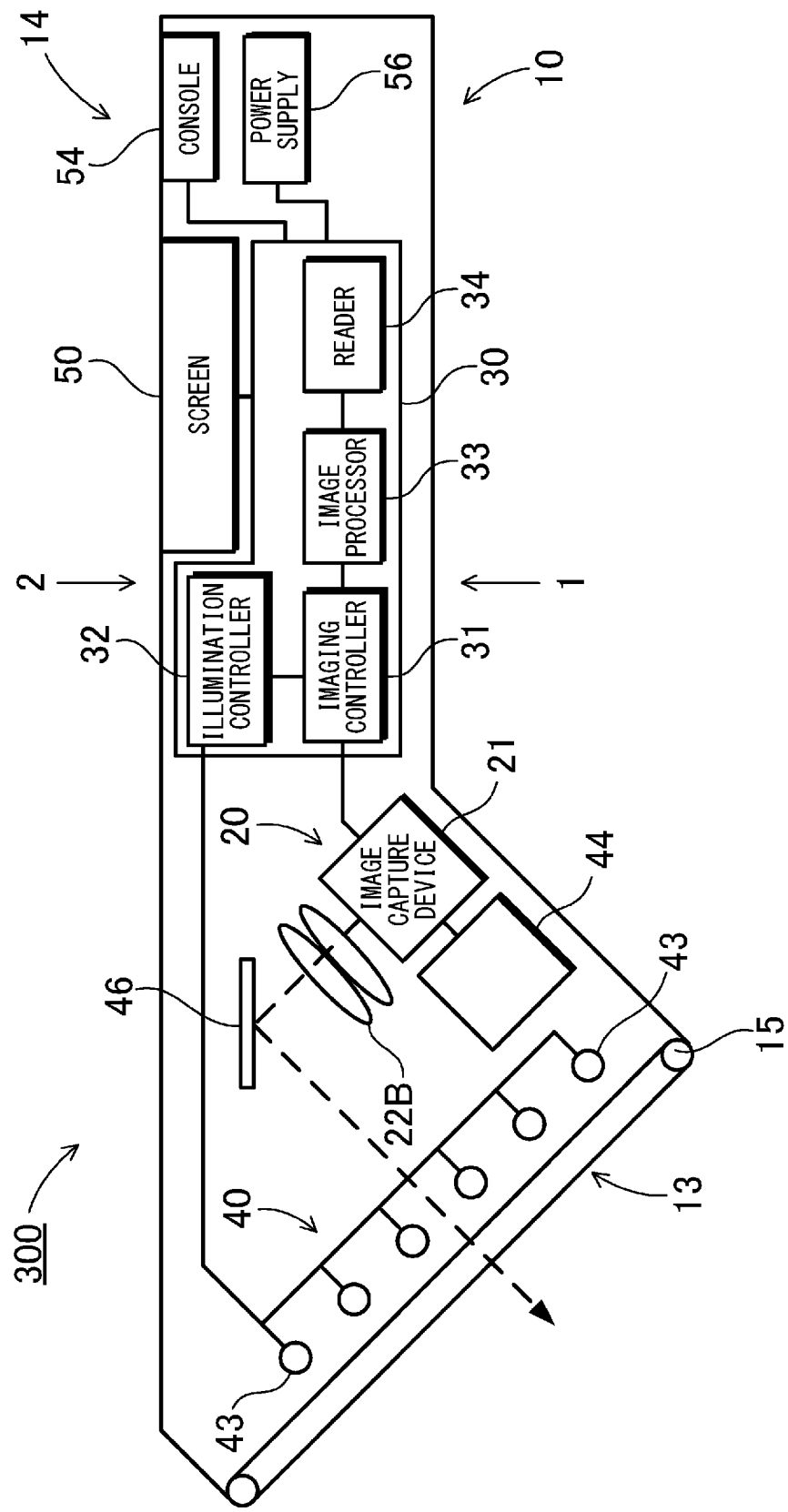
FIG. 45 is a block diagram illustrating an optical information reading device according to the third embodiment.

A handheld optical information reading device 300 according to a third embodiment shown in FIG. 45 Includes a zoom lens 22B which is optically connected to the image capture device 21. In this embodiment, when a magnification of the zoom lens 22B is high, photometric stereo processing is executed. When the magnification of the zoom lens 22B is low, photometric stereo processing is not executed (OFF). That is, photometric stereo processing is switched ON/OFF depending on a magnification of the zoom lens 22B. In the case in which the zoom lens 22B is included, autofocus function can be optically realized which can adjust a focal length.

Multi-Angle Illumination

Figure 46A:
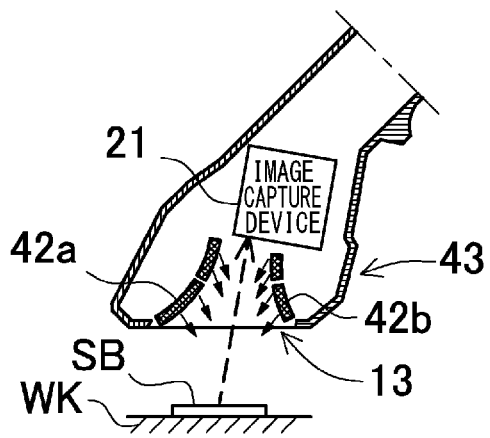
FIGS. 46A to 46C are cross-sectional views showing the illuminator according to the first embodiment.
Figure 46D:
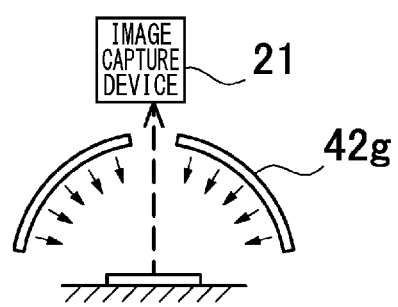
FIGS. 46D to 46F are cross-sectional views showing illuminators of comparative examples.
Figure 46B:
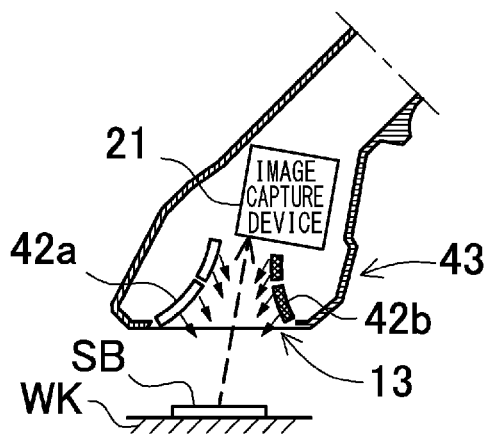
Figure 46E:
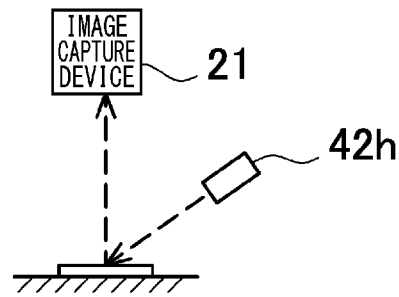
Figure 46C:
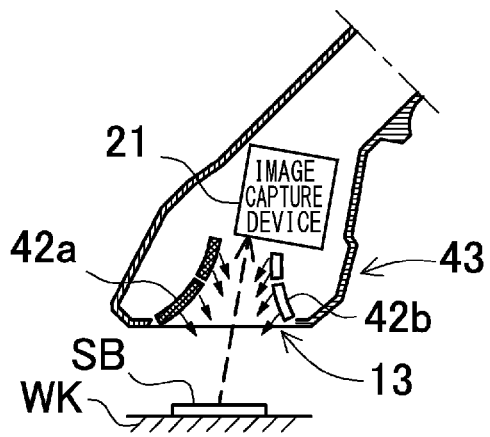
Figure 46F:
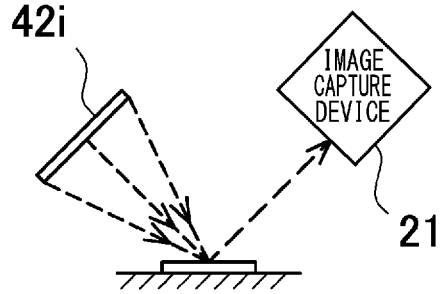

The multi-angle illumination is now described with reference to FIGS. 46A to 46F. FIGS. 46A to 46F are schematic views showing the reading opening 13, the image capture device 21, and the lighting device 43 in proximity to the illuminator 41 as viewed similarly to the cross-sectional view of FIG. 26. FIGS. 46A to 46C show the illuminator according to this embodiment which can realize the multi-angle illumination. FIGS. 46D to 46F show illuminators of comparative examples which are conceivably constructed to realize effects similar to FIGS. 46A to 46C.

As shown in FIG. 46A, when the illuminator is fully lighted up, a symbol is irradiated with light in two or more zenith angles with respect to the symbol. Light sources closer to a workpiece which includes the symbol emit light as dark field light components, and light sources away from the workpiece emit light as bright field light components. The symbol is simultaneously irradiated with bright and dark field light components, that is, the symbol is irradiated with mixed light which includes bright and dark field light components. This mixed light allows the handheld optical information reading device according to this embodiment to read symbols which cannot read by conventional handy terminals. FIG. 46D shows an assumed illumination structure which is conceivably constructed inside a conventional handy terminal to irradiate a workpiece which includes a symbol with such mixed light which includes bright and dark field light components. It can be conceived that a dome-shaped illuminator 42g which is arranged around the image capture device 21 to surround the symbol can realize a similar illumination effect.

Contrary to this, the handheld optical information reading device 100 according to this embodiment emits light not only in the illumination pattern shown in FIG. 46A but also illumination patterns shown in FIGS. 46B and 46C. In other words, the handheld optical information reading device 100 according to this embodiment can realize multi-angle illumination. FIG. 46B shows illumination in which only a lighting device close to the grip 14 is lighted up, and corresponds to the illumination in which only the lower-side lighting device 42b is lighted up as shown in FIG. 10B. The optical axis of the image capture device 21 is inclined with respect to the normal to the reading opening 13 as discussed above. Accordingly, the symbol can be irradiated with the low-angle illumination (lower-side illumination) by lighting up only the lower-side lighting device 42b, which is arranged close to the grip 14. In order to realize such low-angle illumination by using a conventional handy terminal, a lighting device 42h is necessarily inclined with respect to the image capture device 21, which faces a symbol so that its optical axis will be parallel to the normal to a surface on which the symbol is arranged, and arranged close to the symbol as shown in FIG. 46E.

FIG. 46C shows illumination in which only a lighting device opposite to the grip 14 of the handheld optical information reading device 100 is lighted up, and corresponds to the illumination in which only the upper-side lighting device 42a is lighted up as shown in FIG. 10D. A symbol can be irradiated with light as if by a flat light source by lighting up only the upper-side lighting device 42a, which is arranged opposite to the grip 14. In order to realize such flat illumination by using a conventional handy terminal, a flat lighting device 42i is necessarily inclined with respect to the symbol, and the image capture device 21 is necessarily arranged at a position upon which light emitted by the flat lighting device 42i and reflected from the symbol is incident as shown in FIG. 46F. As discussed above, in order to realize different illumination patterns by using one conventional handy terminal, the illuminator and the image capture device 21 are required to shifted between their positions shown in FIGS. 46D, 46E, and 46F. Contrary to this, in the handheld optical information reading device 100 according to this embodiment, the optical axis of the image capture device 21 is inclined. In addition, the upper- and lower-side lighting devices 42a and 42b surround the optical axis, and have different illumination lengths. Additionally, the upper- and lower-side lighting devices 42a and 42b can be independently lighted up. As a result, multi-angle illumination which can provide different illumination effects can be realized by the fixed arrangement of the illuminator and the image capture device 21. In other words, according to the arrangement of the image capture device and the illuminator illustrated in this embodiment, suitable illumination depending on a material of a workpiece and character-printing method can be selected by irradiating the symbol with light in various illumination methods (e.g., multi-angle illumination, low-angle illumination, and flat illumination) by controlling the lighting devices of the illuminator. Therefore, the ability of reading a symbol on a workpiece can be improved.

The handheld optical information reading device and optical information reading method according to the present invention can be suitably used as handy information reading device, handy terminal, commercial-use PDA, and the like which are used in warehouses, factories, stores, hospitals and the like, and read symbols (e.g., bar codes and two dimensional codes) and to store data that is read from the symbols or compare it with previously stored data.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A handheld optical information reading device which optically reads symbols to be read comprising:
a housing;
a grip that is arranged on the housing;
an image capture device that captures an image which can include a symbol;
an illuminator that includes a plurality of lighting devices arranged around the periphery of an optical axis of the image capture device;
an illumination controller that controls the illuminator so as to selectively successively light up the plurality of lighting devices based on a predetermined order whereby irradiating the symbol with light in a different illumination direction with respect to the optical axis of the image capture device;
an imaging controller that controls the image capture device so as to capture images of the symbol, the images being captured with irradiated light in the different illumination direction respectively every time the plurality of lighting devices are successively lighted up based on the predetermined order by the illumination controller;
an image processor that creates an outline image of the symbol based on the images which are captured with light in the different illumination direction respectively; and
a reader that reads the symbol based on the outline image which is created by the image processor,
wherein the illuminator has a reading opening that is enclosed by the plurality of lighting devices which are arranged on a circular or rectangular line extending around the optical axis of the image capture device, and
wherein the handheld optical information reading device further comprises a reading supporter that includes at least two supporting points to be in contact with a surface of an object which includes the symbol to be read outside of the reading opening, and is arranged outside relative to the plurality of lighting devices.

2. The handheld optical information reading device according to claim 1,
wherein the illuminator includes three or more lighting devices around the optical axis of the image capture device,
wherein images that include the symbol are captured every time the three or more lighting devices are selectively successively lighted up based on the predetermined order, and
wherein the image processor processes the images, which include the symbol, through an algorithm depending on the illumination direction, and synthesizes the images, which are processed through the algorithm depending on the illumination direction, whereby creating the outline image.

3. The handheld optical information reading device according to claim 1, wherein the image processor creates a photometric stereo image as the outline image which emphasizes protrusion/recess of the symbol based on a principle of photometric stereo.

4. The handheld optical information reading device according to claim 1, wherein the image processor creates the outline image of the symbol by synthesizing the photometric stereo images based on a principle of photometric stereo if a working distance between the symbol to be read and the handheld optical information reading device is lower than a predetermined value, and does not perform a photometric stereo synthesis if the working distance is not lower than the predetermined value.

5. The handheld optical information reading device according to claim 4,
further comprising a distance-measuring device that measures a working distance between the symbol to be read and the handheld optical information reading device,
wherein the image processor performs the photometric stereo synthesis if the working distance is lower than a predetermined value, and does not perform the photometric stereo synthesis if the working distance is not lower than the predetermined value.

6. The handheld optical information reading device according to claim 1,
further comprising a zoom lens that is optically connected to the image capture device,
wherein the image processor creates the outline image of the symbol by synthesizing photometric stereo images based on a principle of photometric stereo if a magnification of the zoom lens is higher than a predetermined magnification, and does not perform a photometric stereo synthesis if the magnification of the zoom lens is not higher than the predetermined magnification.

7. The handheld optical information reading device according to claim 1, wherein the image processor successively creates four outline images that are created in four sets of image-capture conditions of the illuminator and the image capture device corresponding to combinations of whether the symbol to be read protrudes or is recessed and whether the symbol is bold or thin, and terminates the reading of the symbol without newly creating another outline image if the symbol is successfully read from any of the outline images which have been created by the image processor.

8. A handheld optical information reading device which optically reads symbols to be read comprising:
a housing;
a grip that is arranged on the housing;
an image capture device that captures an image which can include a symbol;
an illuminator that includes a plurality of lighting devices arranged around the periphery of an optical axis of the image capture device;
an illumination controller that controls the illuminator so as to selectively successively light up the plurality of lighting devices based on a predetermined order whereby irradiating the symbol with light in a different illumination direction with respect to the optical axis of the image capture device;
an imaging controller that controls the image capture device so as to capture images of the symbol, the images being captured with irradiated light in the different illumination direction respectively every time the plurality of lighting devices are successively lighted up based on the predetermined order by the illumination controller;

an image processor that creates an outline image of the symbol based on the images which are captured with light in the different illumination direction respectively; and a reader that reads the symbol based on the outline image which is created by the image processor, wherein the housing comprises:
the grip which is arranged on one longitudinal end side of the housing, and
a screen that displays an image that is captured by the image capture device, and is arranged on another longitudinal end side, and wherein the grip includes a console that includes control keys to be operated by users, and a display on the screen can be changed by the user's operation, and wherein the housing includes a first part that has a plate shape with a roughly constant thickness, and a second part that is located adjacent to the first part, wherein the grip and the reading opening are arranged on the first and second parts, respectively, and the screen is arranged on a surface of the housing that is opposite to another surface on which the reading opening is formed, and lies astride the first and second parts.

9. The handheld optical information reading device according to claim 8, wherein the screen can display a real-time image that is updated at timing of image capture every time all the lighting devices of the illuminator are lighted up.

10. The handheld optical information reading device according to claim 8, wherein
the illumination controller that controls the illuminator so as to light up groups of light sources including at least one of the plurality of lighting devices respectively whereby simultaneously irradiating the symbol with light including bright-field and dark-field light components of the groups of the light sources from the periphery of a reading opening that is enclosed by the illuminator, which has a circular or rectangular shape, and is slantly opened with respect to the optical axis of the image capture device and the housing, and further comprising
an illumination changer that is arranged on the screen to switch a type of light to be irradiated to the symbol.

11. A handheld optical information reading device which optically reads symbols to be read comprising:
a housing;
a grip that is arranged on the housing;
an image capture device that captures an image which can include a symbol;
an illuminator that includes a plurality of lighting devices arranged around the periphery of an optical axis of the image capture device;
an illumination controller that controls the illuminator so as to selectively successively light up the plurality of lighting devices based on a predetermined order whereby irradiating the symbol with light in a different illumination direction with respect to the optical axis of the image capture device;
an imaging controller that controls the image capture device so as to capture images of the symbol, the images being captured with irradiated light in the different illumination direction respectively every time the plurality of lighting devices are successively lighted up based on the predetermined order by the illumination controller;

an image processor that creates an outline image of the symbol based on the images which are captured with light in the different illumination direction respectively; and a reader that reads the symbol based on the outline image which is created by the image processor, and wherein the illumination controller includes an illumination changer that switches between photometric stereo illumination and multi-angle illumination modes which differently control lighting of the illuminator, wherein the symbol is irradiated with light based on a principle of photometric stereo in the photometric stereo illumination mode, and the symbol is irradiated with light at angles in the multi-angle illumination mode.

12. The handheld optical information reading device according to claim 11, wherein the illuminator includes a lighting device for photometric stereo illumination and a lighting device for the multi-angle illumination which are separately provided.

13. The handheld optical information reading device according to claim 11, wherein the illumination controller controls illumination light depending on an illumination setting which is selected through the console.

14. The handheld optical information reading device according to claim 11, wherein the image processor creates a photometric stereo image as the outline image which emphasizes protrusion/recess of the symbol based on a principle of photometric stereo.

15. The handheld optical information reading device according to claim 11, wherein the illuminator further includes a diffusion plate that diffuses light that is emitted by the groups of light sources.

16. A handheld optical information reading device which optically reads symbols to be read comprising:
a housing that has a first surface and a second surface opposite to the first surface;
a grip that is arranged on the housing;
a console that includes control keys which allow users to enter numerals or characters, and is arranged on the second surface;
an image capture device that has an optical axis, and is arranged on the first surface side to capture an image which can include a symbol;
an illuminator that has a circular or rectangular shape surrounding the optical axis of the image capture device, and includes groups of light sources which are arranged on the first surface side in a ring shape around the optical axis of the image capture device whereby irradiating the symbol with light from the periphery of the symbol;
an illumination controller that controls the illuminator so as to light up the groups of light sources whereby irradiating the symbol with the groups of light sources from the periphery of a reading opening that is enclosed by the illuminator, which has the circular or rectangular shape, and is slantly opened with respect to the optical axis of the image capture device and the housing;
an image processor that reads the symbol included in the image which is captured by the image capture device when the symbol is irradiated with light from the groups of light sources;
a screen that is arranged on the second surface, and can display the numerals or characters which are entered through the console and the image which can include the symbol, which is captured by the image capture device when the groups of light sources are lighted up; and an illumination changer that is arranged on the screen to switch a type of light to be irradiated to the symbol, wherein the illuminator further includes:

a coaxial lighting device that is arranged on the first surface side, and emits light coaxially with the optical axis of the image capture device;

a first group of lighting devices that is arranged in a ring shape around the optical axis of the image capture device; and a second group of lighting devices that is arranged in a ring shape around the optical axis of the image capture device further away from the image capture device relative to the first group of lighting devices, wherein the illumination controller can selectively light up the first and second groups of lighting devices, wherein the image capture device captures the image which can include the symbol through light, and wherein the image processor reads the symbol from the images that are captured both when the symbol is irradiated with light by the first group of lighting devices and when the symbol is irradiated with light by the second group of lighting devices.

17. The handheld optical information reading device according to claim 16, wherein the illumination controller controls illumination light depending on an illumination setting which is selected through the console.

18. The handheld optical information reading device according to claim 16, wherein the illumination controller changes adjustment parameters relating to the first or second group of lighting devices when lighting up the illuminator, wherein the adjustment parameters include at least a characteristic size parameter relating to a character size or dot size of the symbol to be read and an inversion parameter of protrusion/recess of the symbol, and wherein the image processor determines the adjustment parameters based on decoded results from a plurality of images that are captured when the symbol is irradiated with light in conditions corresponding to differently controlled adjustment parameters by the illuminator.

19. The handheld optical information reading device according to claim 16, wherein the illuminator further includes a diffusion plate that diffuses light that is emitted by the groups of light sources.

20. The handheld optical information reading device according to claim 16, wherein the type of light to be irradiated to the symbol includes a multi-angle illumination, lower-side illumination, illumination for recessed and protruding characters, or any combination thereof.

* * * * *